(12) United States Patent
Nakayama et al.

(10) Patent No.: US 8,264,779 B2
(45) Date of Patent: Sep. 11, 2012

(54) ZOOM LENS AND IMAGE PICKUP APPARATUS INCLUDING SAME

(75) Inventors: Hiroki Nakayama, Shimotsuke (JP); Chiaki Inoue, Utsunomiya (JP); Masaru Sakamoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 12/895,575

(22) Filed: Sep. 30, 2010

(65) Prior Publication Data

US 2011/0080652 A1 Apr. 7, 2011

(30) Foreign Application Priority Data

Oct. 6, 2009 (JP) ................................. 2009-232226

(51) Int. Cl.
*G02B 15/14* (2006.01)
(52) U.S. Cl. .......................... 359/683; 359/687; 359/676
(58) Field of Classification Search .................. 359/676, 359/683, 684, 685, 687, 695
See application file for complete search history.

(56) References Cited

U.S. PATENT DOCUMENTS

| 5,528,427 | A  | * | 6/1996  | Tanaka et al. ................. 359/683 |
|-----------|----|---|---------|---------------|
| 7,206,137 | B2 |   | 4/2007  | Nakatani      |
| 7,428,107 | B2 |   | 9/2008  | Nishimura     |
| 7,609,446 | B2 |   | 10/2009 | Nanba         |

* cited by examiner

*Primary Examiner* — Alicia M Harrington
(74) *Attorney, Agent, or Firm* — Canon U.S.A., Inc. IP Division

(57) ABSTRACT

A zoom lens includes, in order from an object side to an image side and arranged along an optical axis, first to fifth lens units having positive, negative, positive, positive or negative, and positive refractive power, respectively. When zooming, the second lens unit moves monotonically to the image side, the third lens unit moves to the object side in a convex locus, the fifth lens unit moves nonlinearly, and the first and fourth lens units do not move. The fourth lens unit includes a first sub lens unit and a second sub lens unit; the first sub lens unit is an image-stabilizing lens unit that includes a first lens having negative refractive power and a second lens having positive or negative refractive power. The focal length of the fourth lens unit, the focal length of the entire system at the wide-angle end, the Abbe numbers of the materials of the first and second lenses are set appropriately based on predetermined conditions.

9 Claims, 16 Drawing Sheets

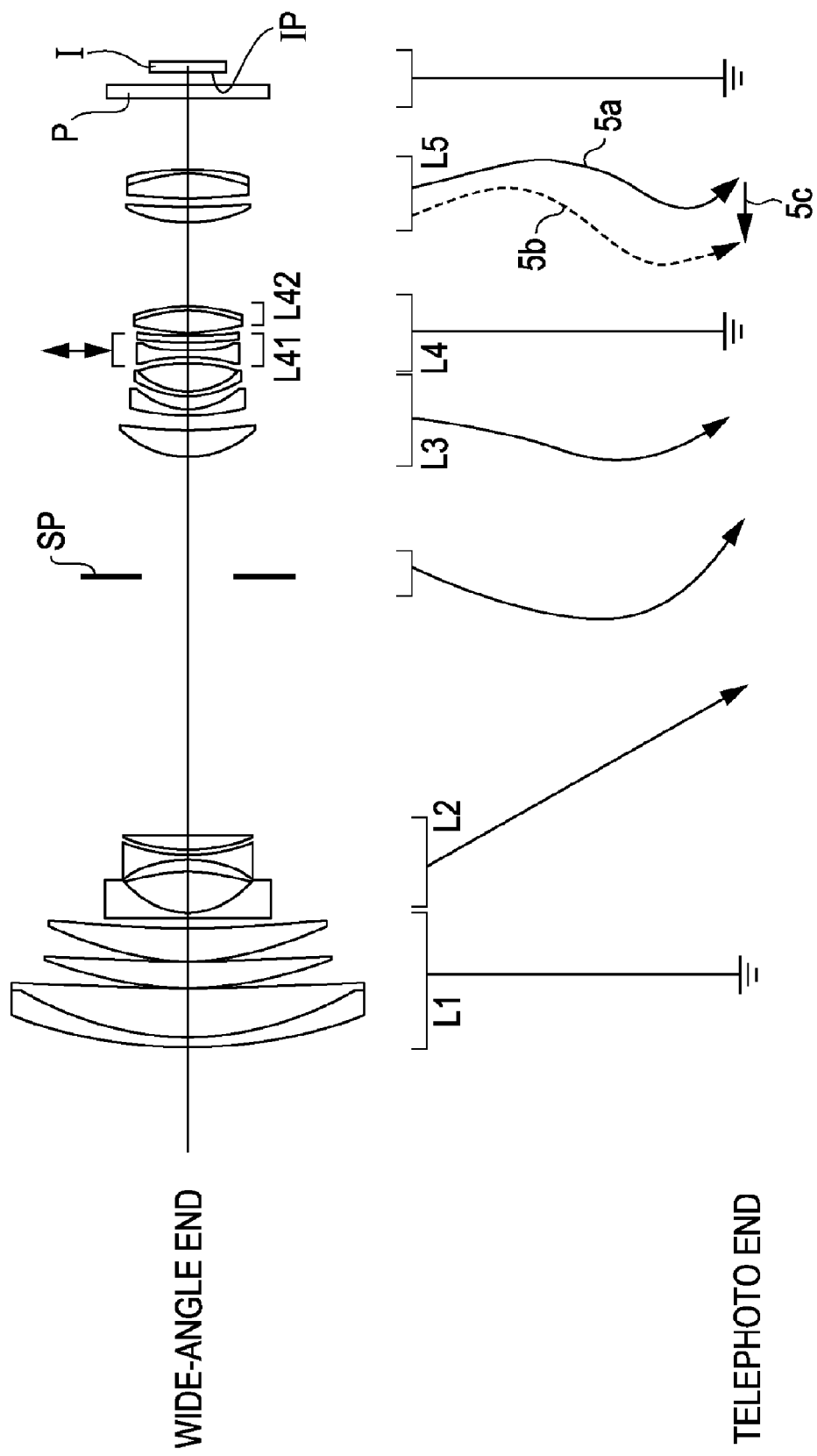

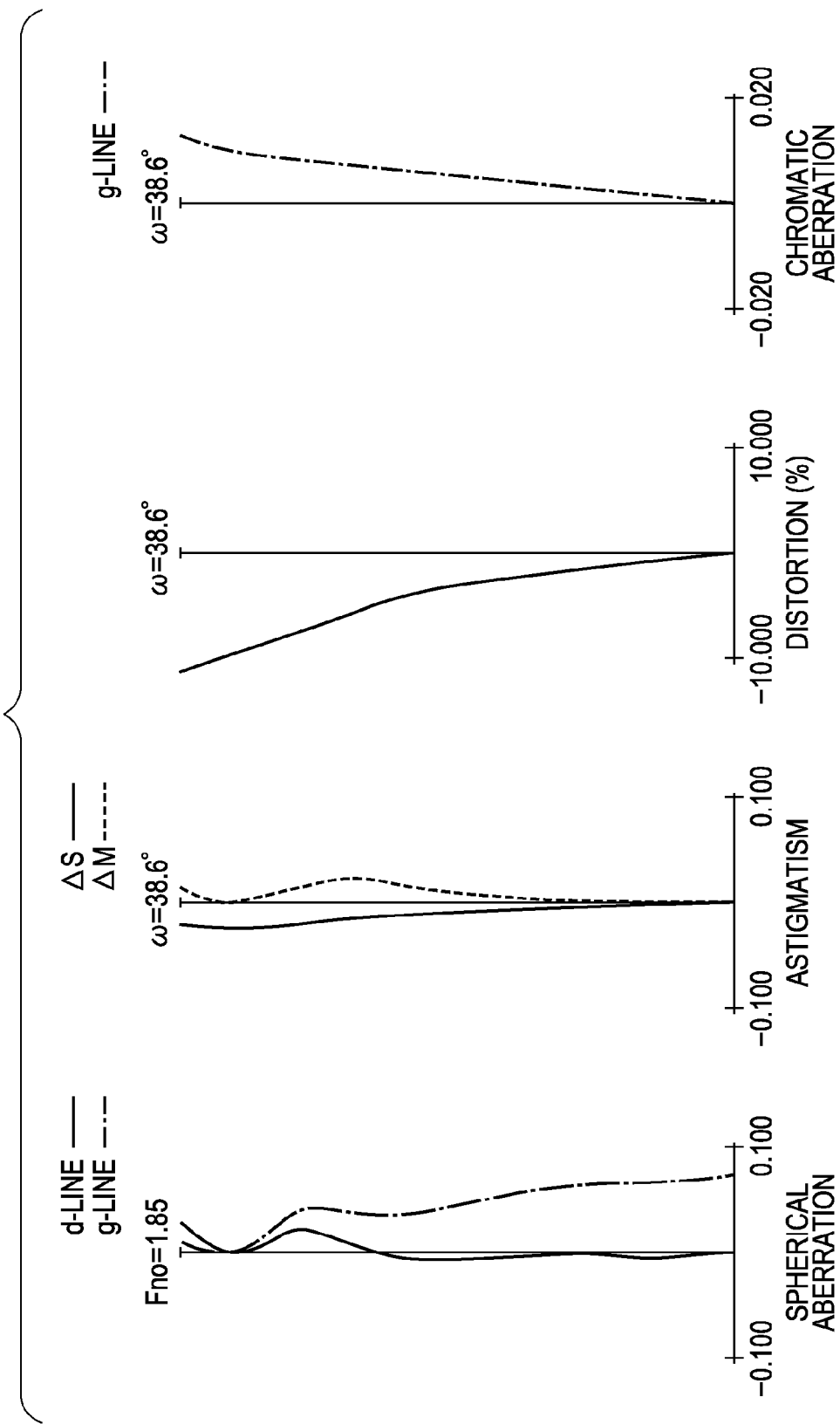

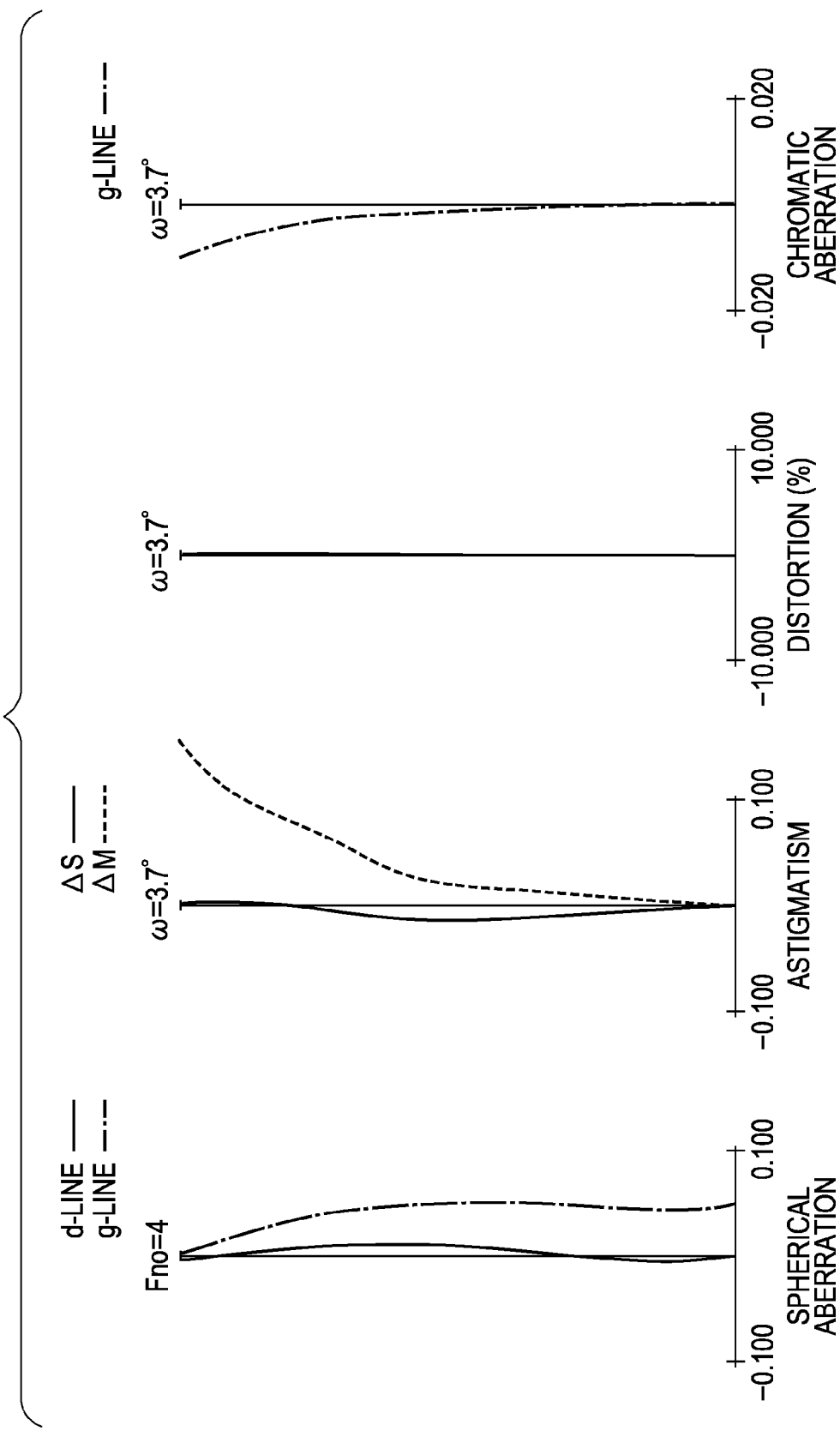

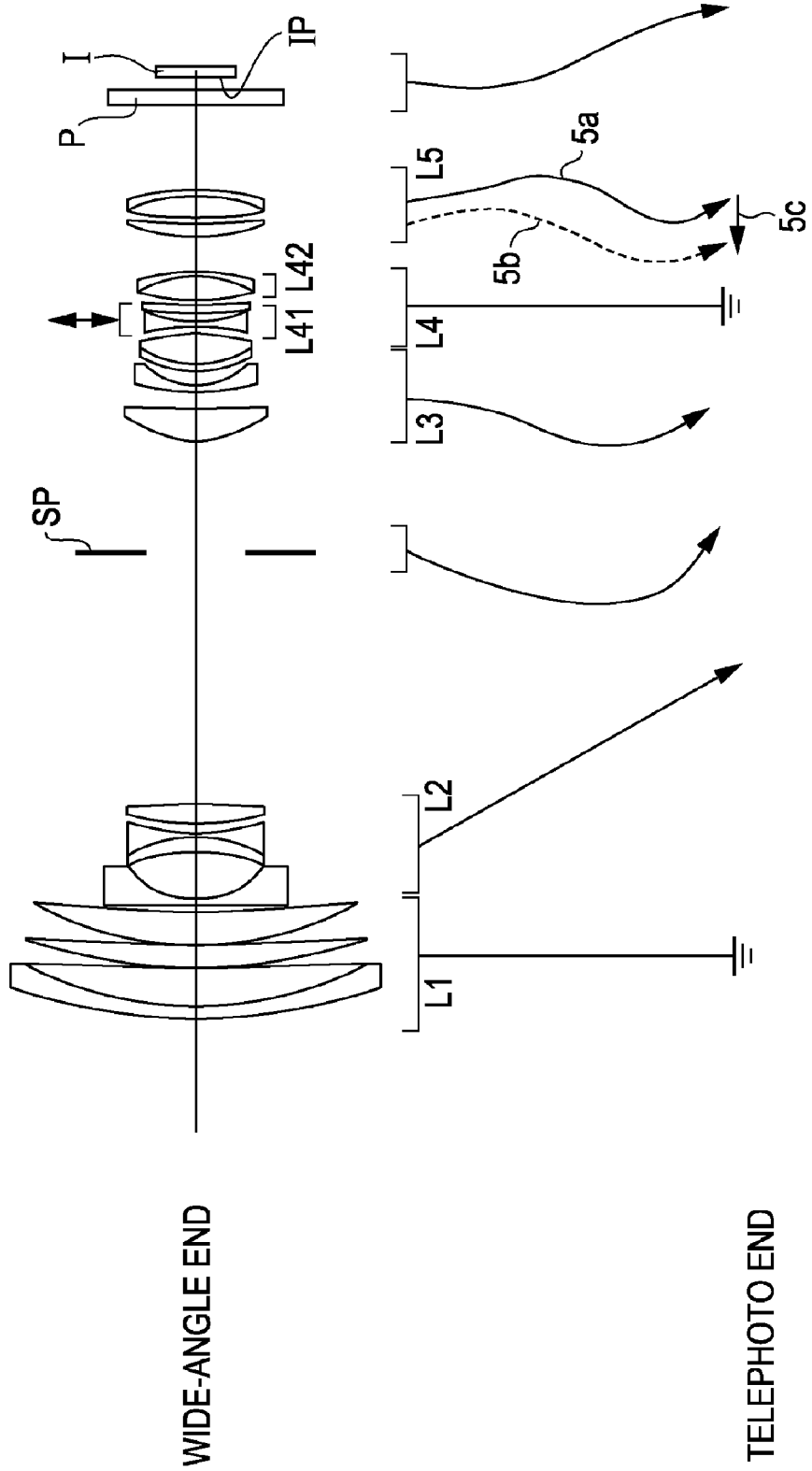

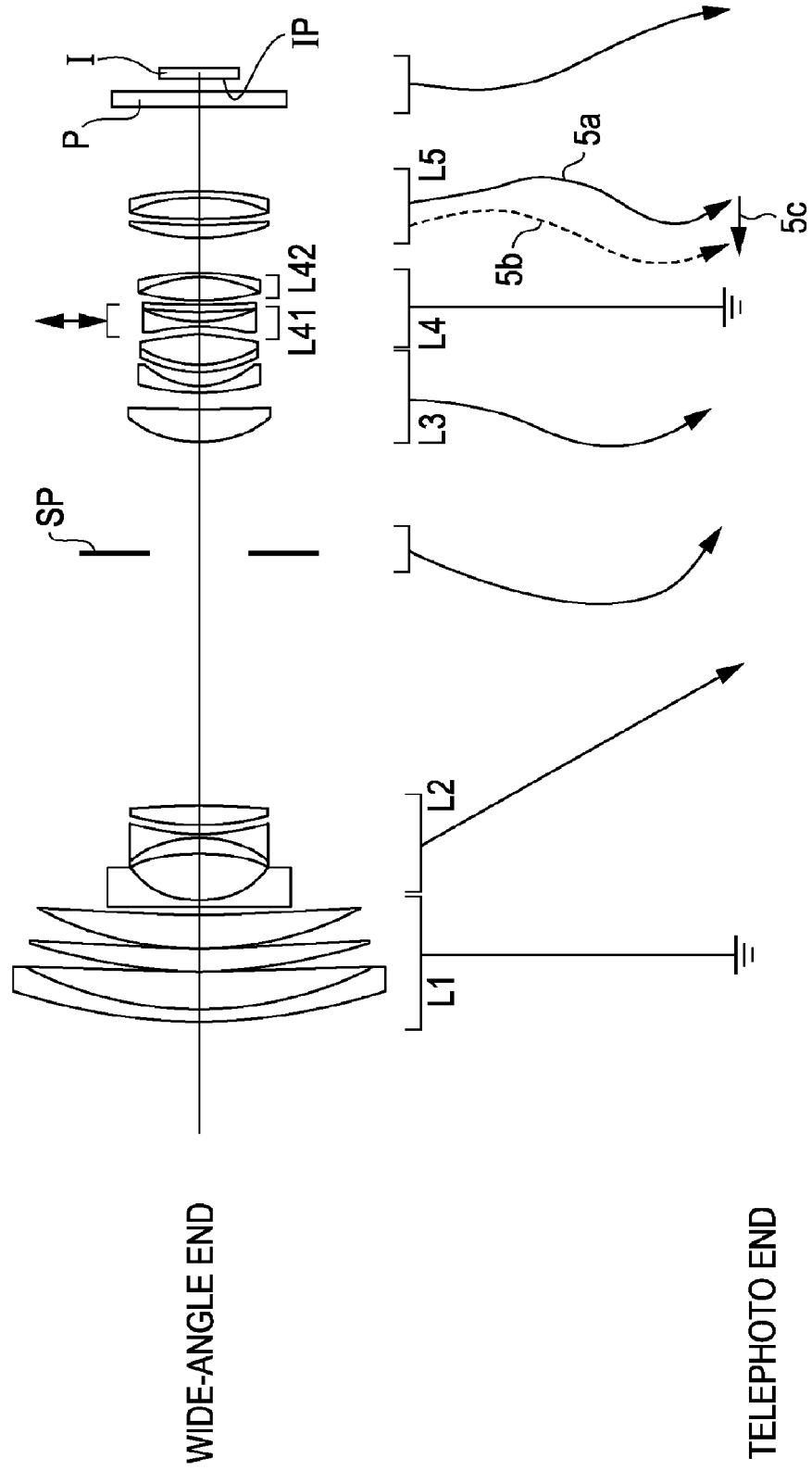

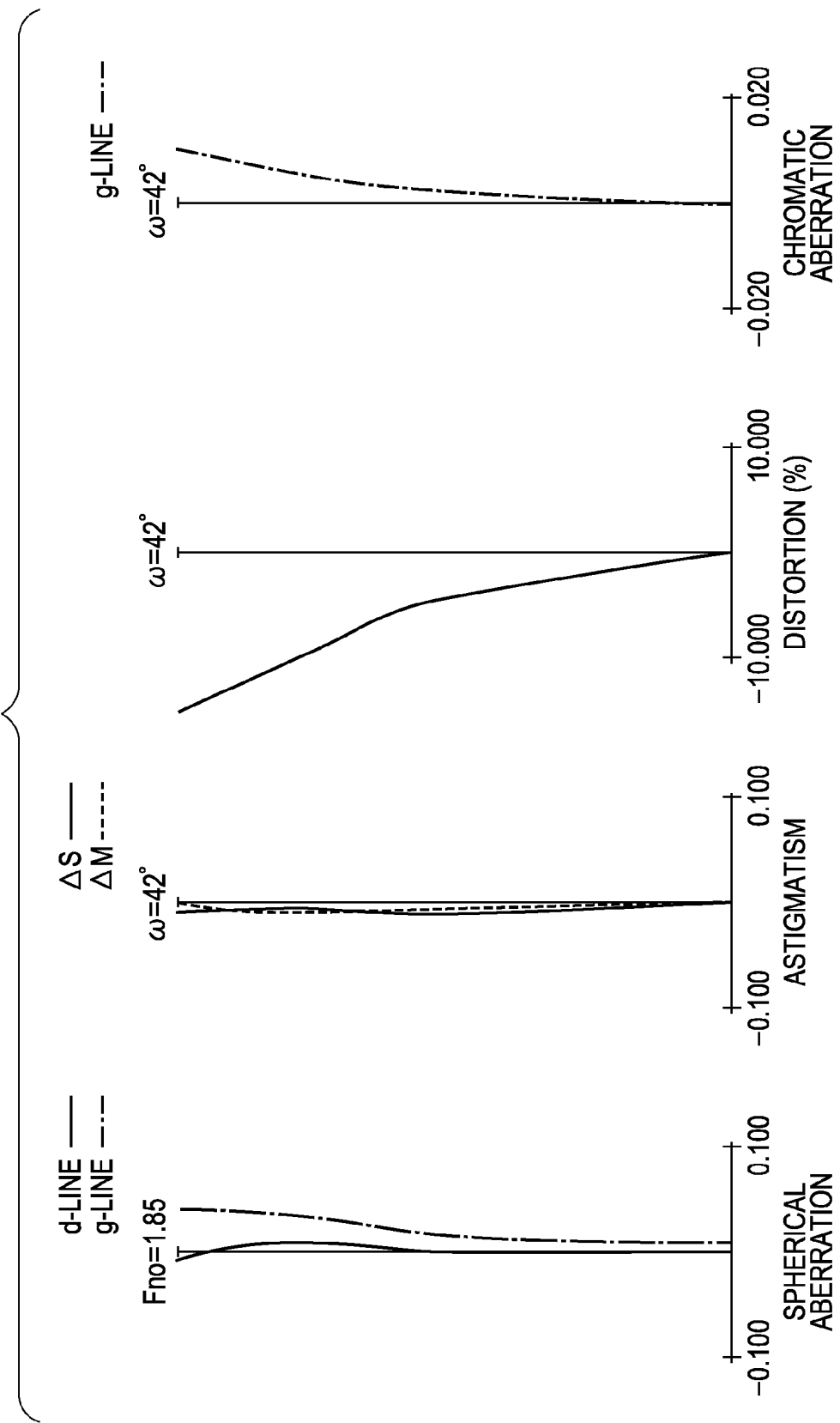

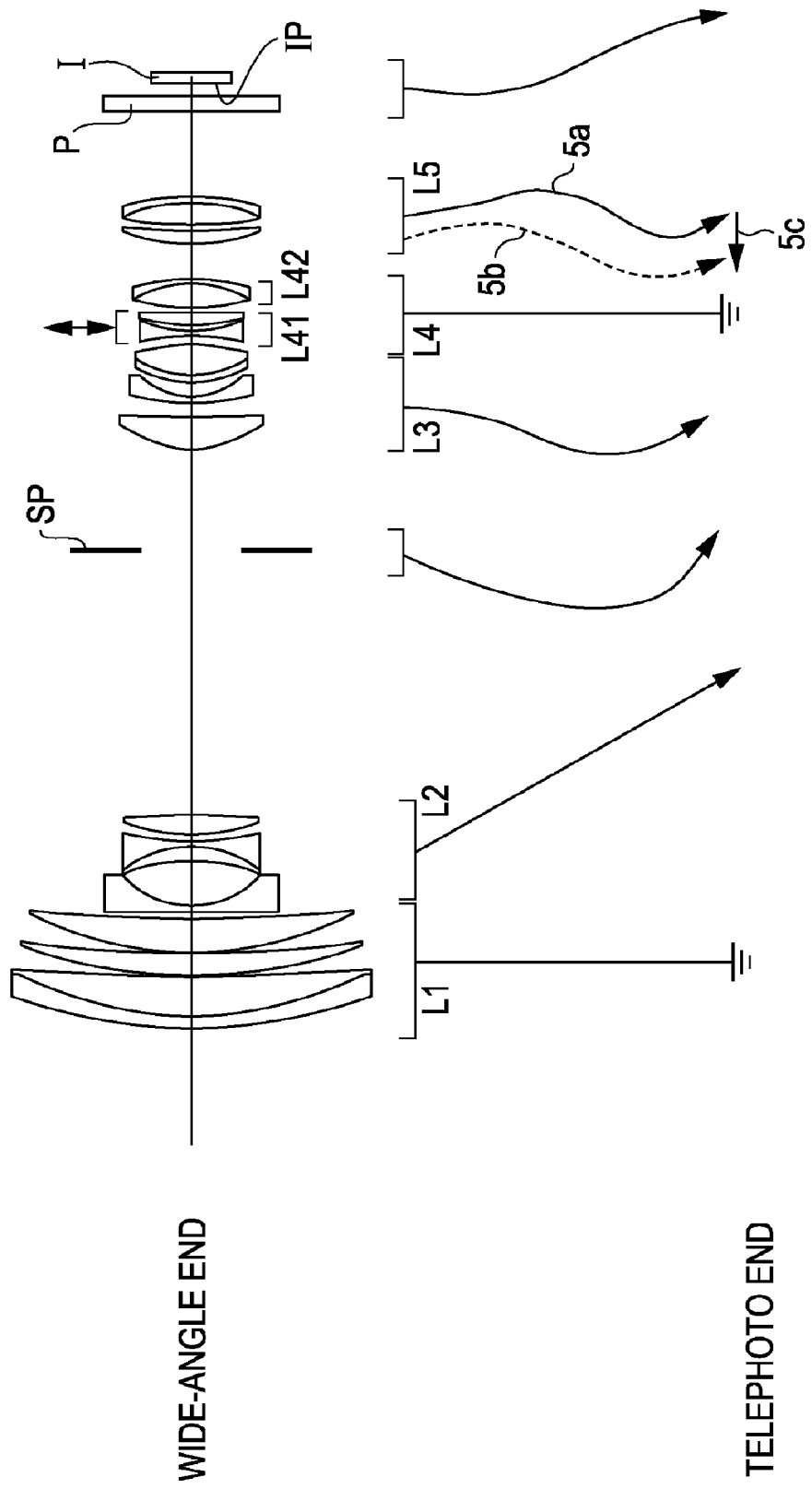

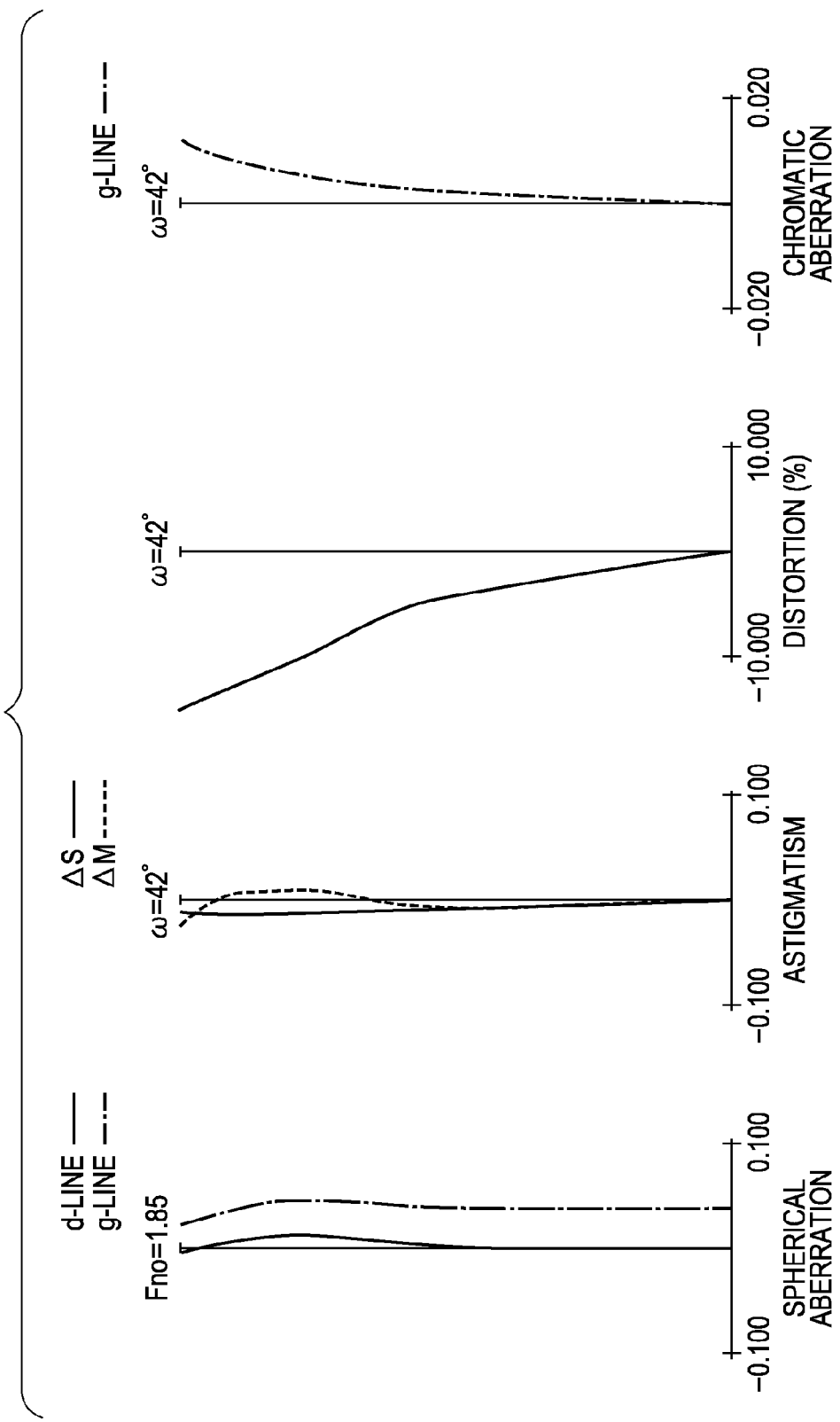

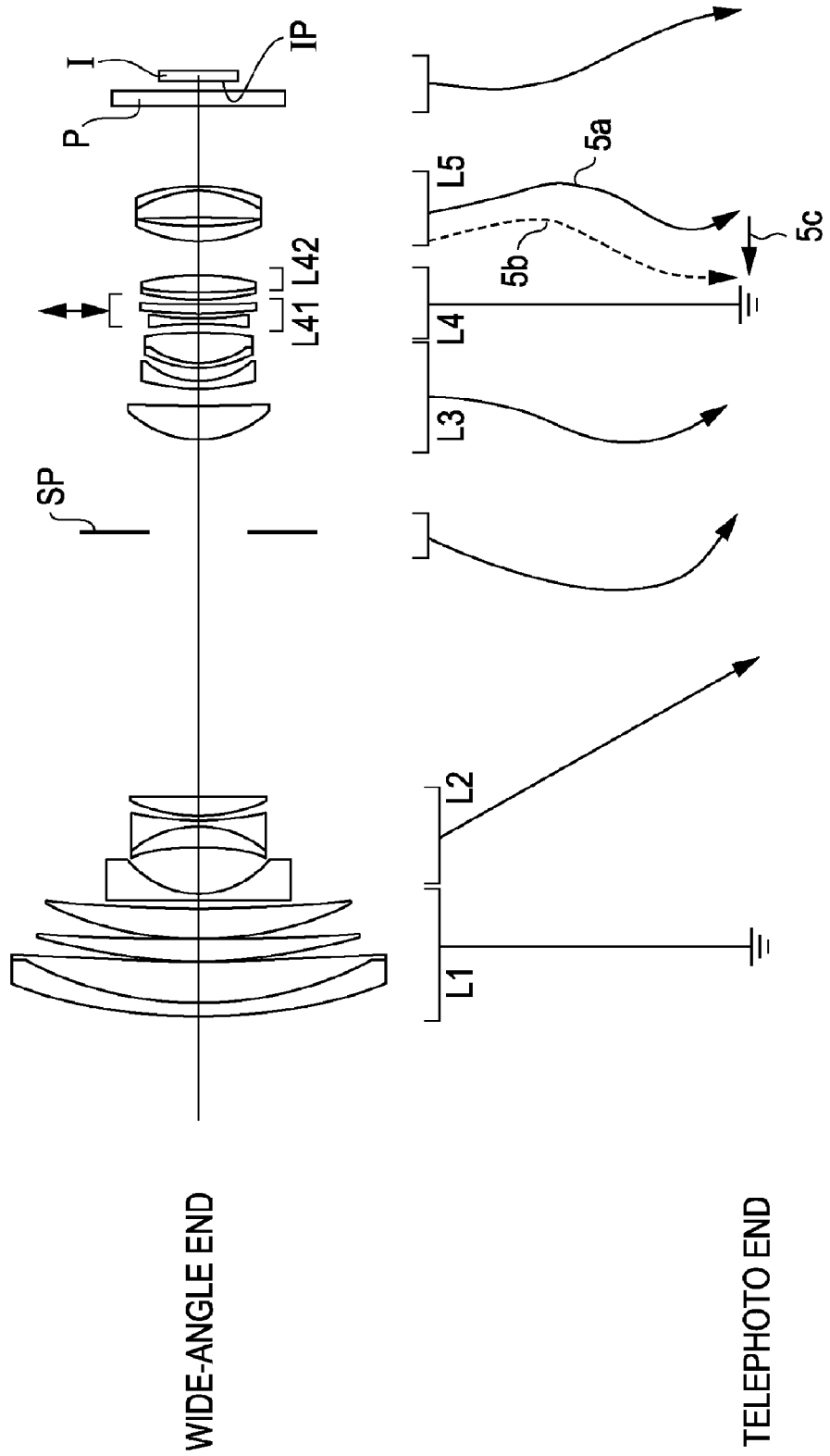

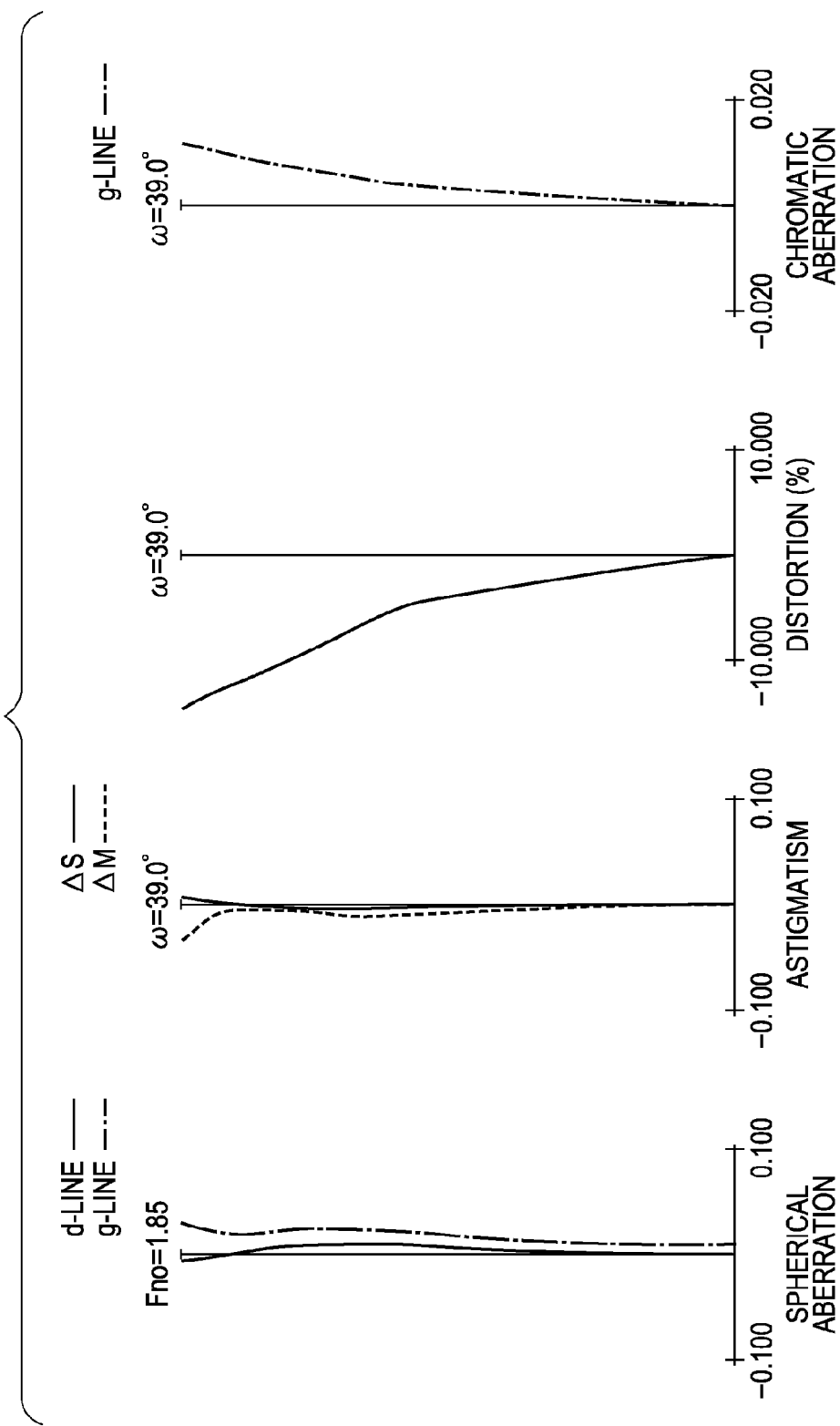

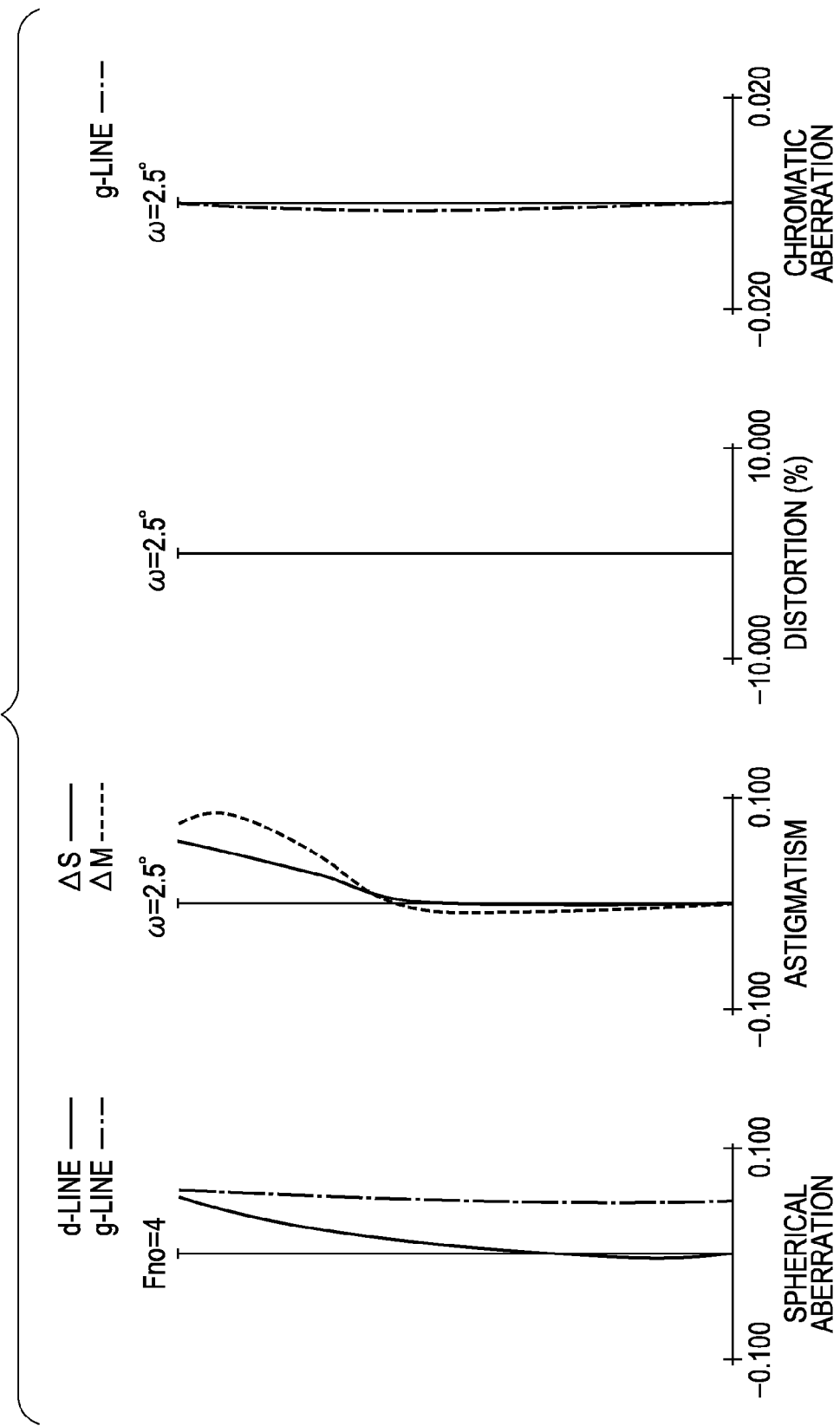

ZOOM LENS AND IMAGE PICKUP APPARATUS INCLUDING SAME

BACKGROUND OF THE INVENTION

1. Field of the Invention

The present invention relates to an optical system and more specifically to a zoom lens suitable for use in an image pickup apparatus such as electrophotographic cameras and video cameras.

2. Description of the Related Art

Zoom lenses for image pickup apparatuses that use solid-state image pickup elements, such as digital cameras and video cameras, are required to have a compact optical system having a high zoom ratio. A known example of zoom lenses that satisfy those requirements is a positive-lead type zoom lens in which a lens unit closest to the object to be imaged is constituted of lenses having positive refractive power. Another known zoom lens has image stabilizing function involving compensating image blur that occurs when vibrations propagate to an image capturing system by moving some of the lens units in a direction perpendicular to the optical axis. A known example of the positive-lead type zoom lens is a compact zoom lens having a high zoom ratio and image stabilizing function, composed of lens units having, in order from the object side to the image side, positive, negative, positive, negative, and positive refractive power. U.S. Pat. Nos. 7,609,446 and 7,428,107 disclose zoom lenses having image stabilizing function in which image blur is corrected by moving a fourth lens unit in a direction perpendicular to the optical axis. Another known example of the positive-lead type zoom lens is described in U.S. Pat. No. 7,206,137. U.S. Pat. No. 7,206,137 discloses a zoom lens constituted of, in order from the object side to the image side, five lens units having positive, negative, positive, positive, and positive refractive power. As used herein, the side of a lens where an object to be imaged is placed is referred to as the object side or front side of the lens; and the side of the lens where the image is formed is referred to as the image side or back side of the lens.

To correct image blur (motion blur) by moving a compensation lens unit in the direction perpendicular to the optical axis, the compensation lens unit is required to be small and lightweight to achieve the size reduction and power saving of a moving mechanism. In addition, minimal aberration changes during image blur correction and high optical performance are also required. To obtain a zoom lens that satisfies those requirements, it is important to appropriately set the zoom type and the configuration of the image stabilizing compensation lens unit.

SUMMARY OF THE INVENTION

A zoom lens according to an aspect of the present invention includes, in order from an object side to an image side and arranged along an optical axis, a first lens unit having positive refractive power, a second lens unit having negative refractive power, a third lens unit having positive refractive power, a fourth lens unit having positive or negative refractive power, and a fifth lens unit having positive refractive power. When zooming from the wide-angle end to the telephoto end, the second lens unit moves monotonically to the image side, the third lens unit moves to the object side in a convex locus, the fifth lens unit moves nonlinearly, and the first and fourth lens units do not move for zooming, the fourth lens unit including a first sub lens unit having negative refractive power and a second sub lens unit having positive refractive power, and the first sub lens unit being moved so as to have a component perpendicular to the optical axis to thereby move the imaging position in a direction perpendicular to the optical axis. The first sub lens unit includes a first lens having negative refractive power and a second lens having positive or negative refractive power and satisfies the following conditions:

$$|f4/fw|>10.0$$

$$v411>60.00$$

$$v412<35.00$$

where f4 is the focal length of the fourth lens unit, fw is the focal length of the entire system at the wide-angle end, v411 is the Abbe number of the material of the first lens, and v412 is the Abbe number of the material of the second lens.

The present invention provides a zoom lens having high optical performance and including a compact and lightweight image-blur compensation lens unit that can appropriately correct imaging aberration.

Further features of the present invention will become apparent to persons having ordinary skill in the art from the following description of exemplary embodiments with reference to the attached drawings.

BRIEF DESCRIPTION OF THE DRAWINGS

FIG. 1 is a cross-sectional view, at a wide-angle end, of a zoom lens according to a first embodiment of the present invention.

FIG. 2A is an aberration diagram, at the wide-angle end, of the first embodiment of the present invention.

FIG. 2B is an aberration diagram, at the telephoto end, of the first embodiment of the present invention.

FIG. 3 is a cross-sectional view of a zoom lens, at the wide-angle end, according to a second embodiment of the present invention.

FIG. 5 is a cross-sectional view of a zoom lens, at the wide-angle end, according to a third embodiment of the present invention.

FIG. 6A is an aberration diagram, at the wide-angle end, of the third embodiment of the present invention.

FIG. 7 is a cross-sectional view of a zoom lens, at the wide-angle end, according to a fourth embodiment of the present invention.

FIG. 8A is an aberration diagram, at the wide-angle end, of the fourth embodiment of the present invention.

FIG. 9 is a cross-sectional view of a zoom lens, at the wide-angle end, according to a fifth embodiment of the present invention.

FIG. 10A is an aberration diagram, at the wide-angle end, of the fifth embodiment of the present invention.

FIG. 10B is an aberration diagram, at the telephoto end, of the fifth embodiment of the present invention.

DESCRIPTION OF THE EMBODIMENTS

Zoom lenses and image pickup apparatuses including the same according to embodiments of the present invention will be described hereinbelow. The zoom lenses according to embodiments of the present invention include, in order from the object side to the image side, a first lens unit having positive refractive power, a second lens unit having negative refractive power, a third lens unit having positive refractive power, a fourth lens unit having positive or negative refractive power, and a fifth lens unit having positive refractive power. When zooming from the wide-angle end to the telephoto end, the second lens unit moves linearly to the image side; the third lens unit moves to the object side in a convex locus; the fifth lens unit moves to the image side, then moves to the object side, and thereafter moves nonlinearly to the image side again. The first and fourth lens units do not move for zooming. The fourth lens unit is constituted of a first sub lens unit having negative refractive power and a second sub lens unit having positive refractive power. The first sub lens unit is moved so as to have a component perpendicular to the optical axis to thereby move the imaging position in the direction perpendicular to the optical axis, thereby correcting displacement that occurs when the zoom lens vibrates, that is, performing image stabilization.

Figure 4A:
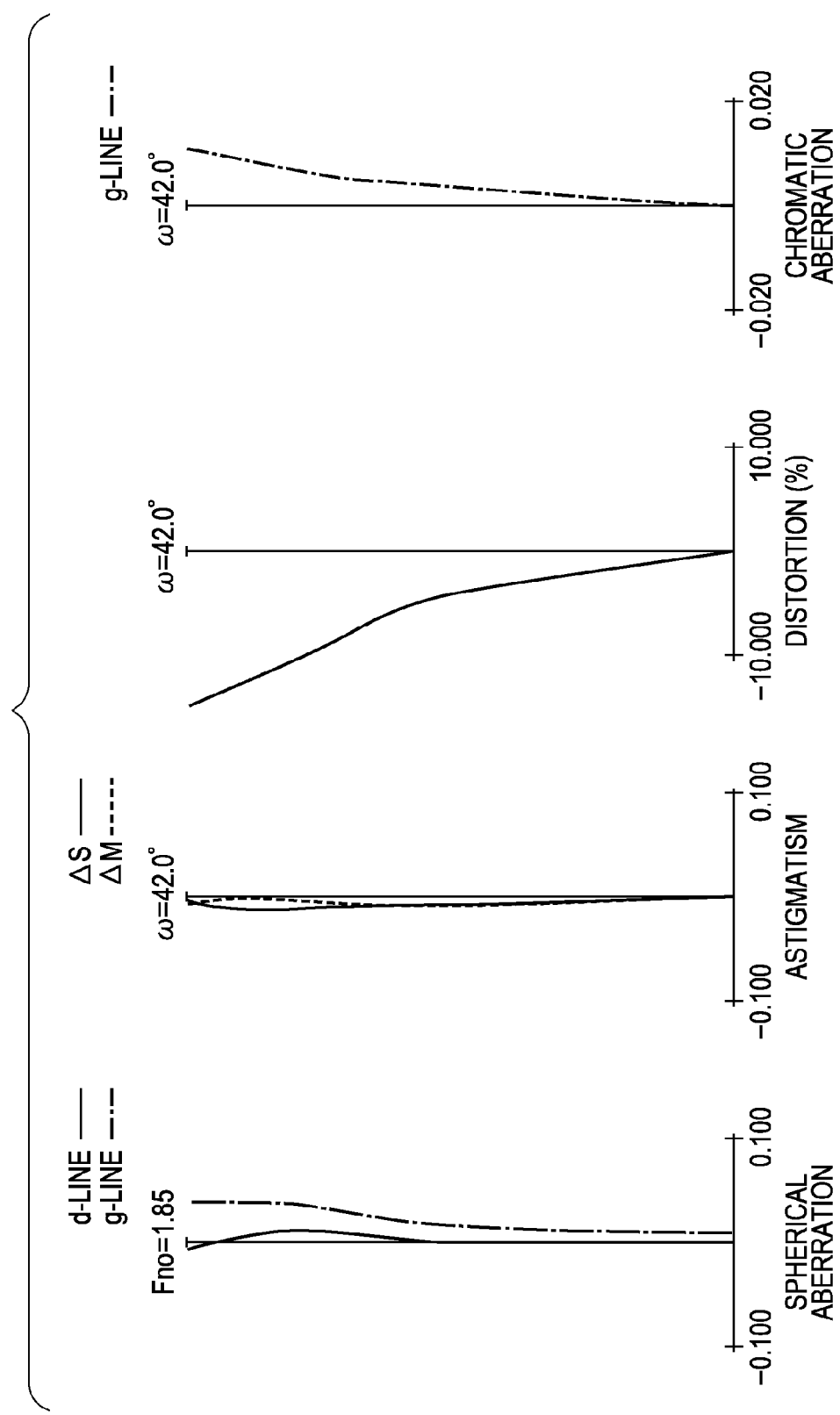
FIG. 4A is an aberration diagram, at the wide-angle end, of the second embodiment of the present invention.
Figure 4B:
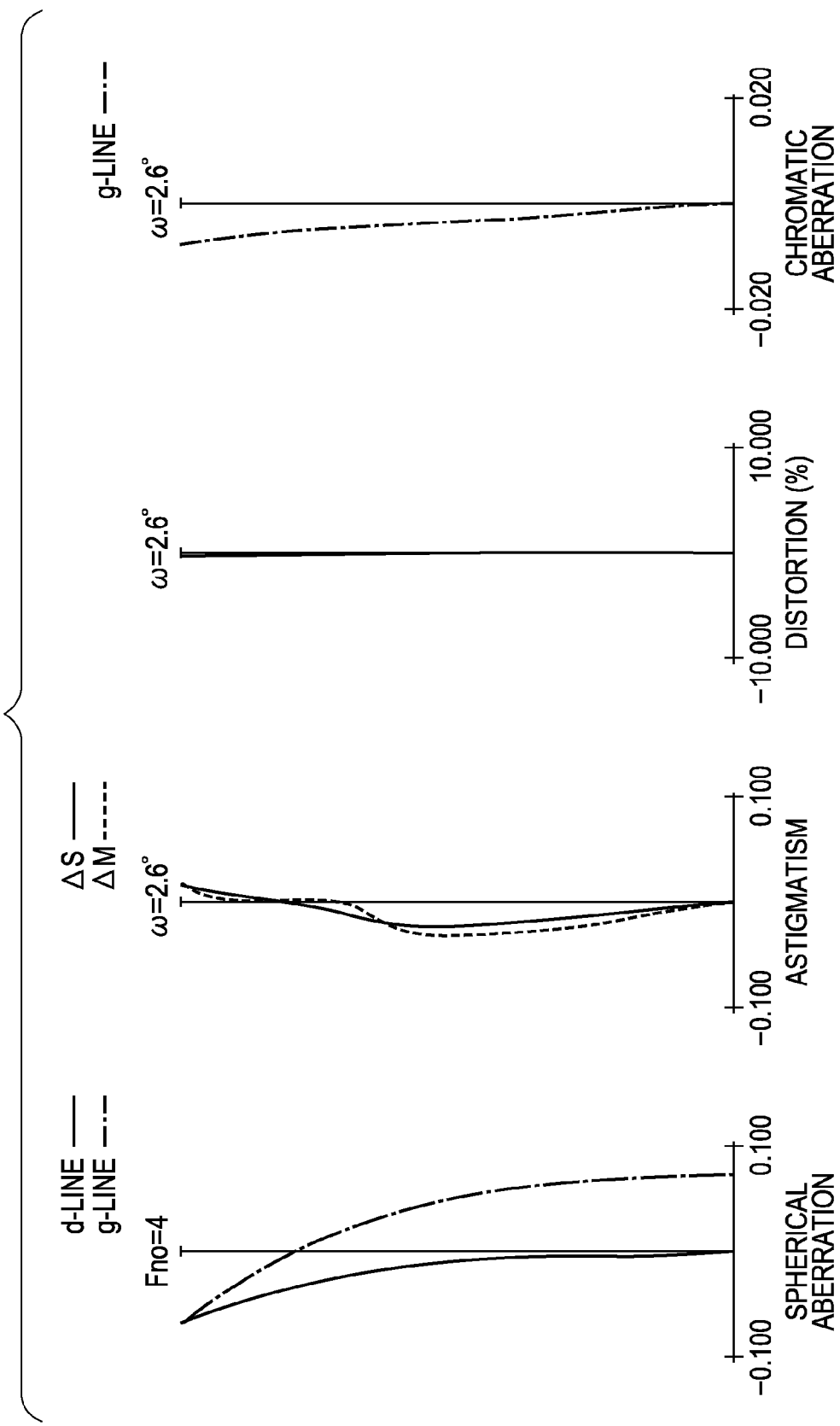
FIG. 4B is an aberration diagram, at the telephoto end, of the second embodiment of the present invention.
Figure 6B:
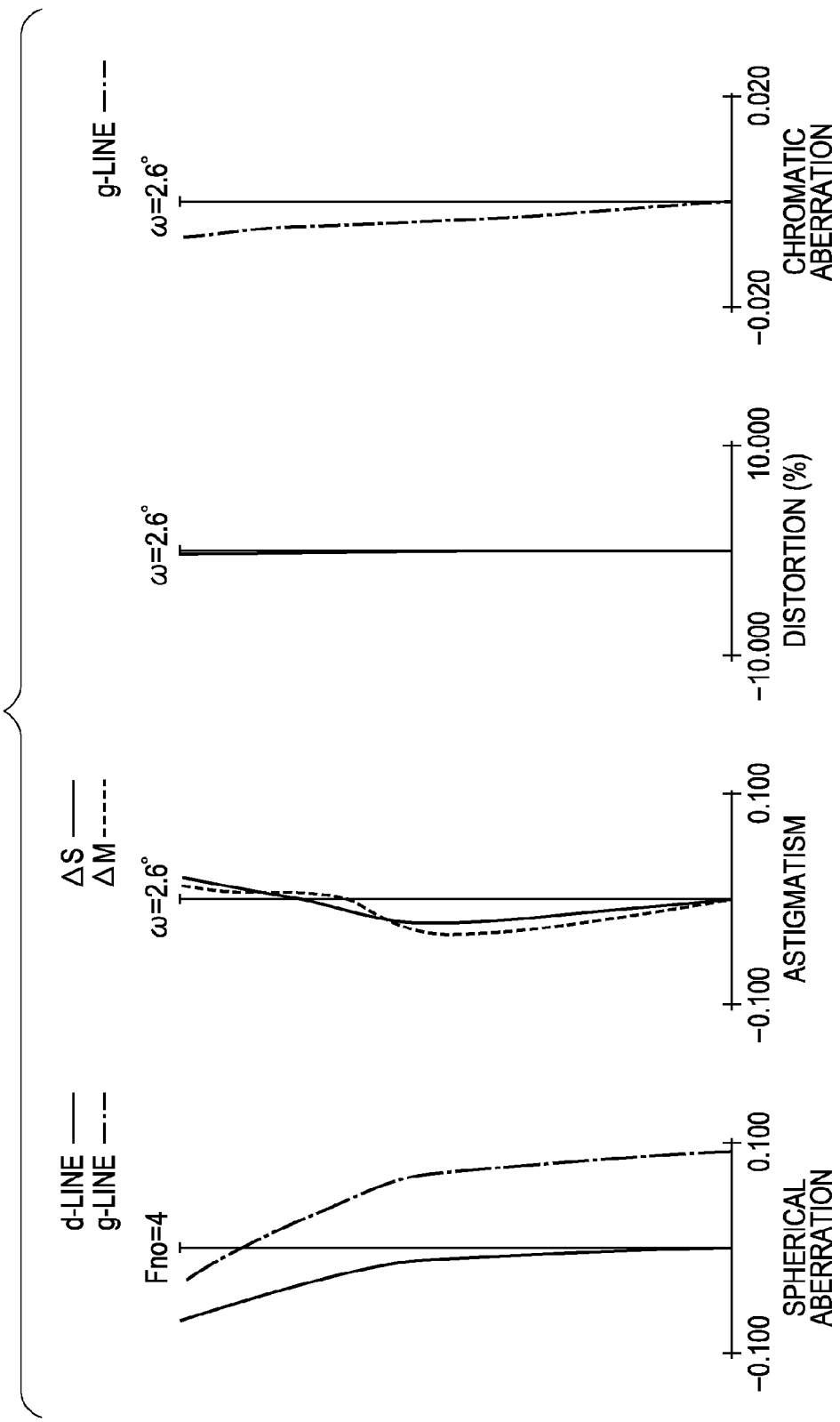
FIG. 6B is an aberration diagram, at the telephoto end, of the third embodiment of the present invention.
Figure 8B:
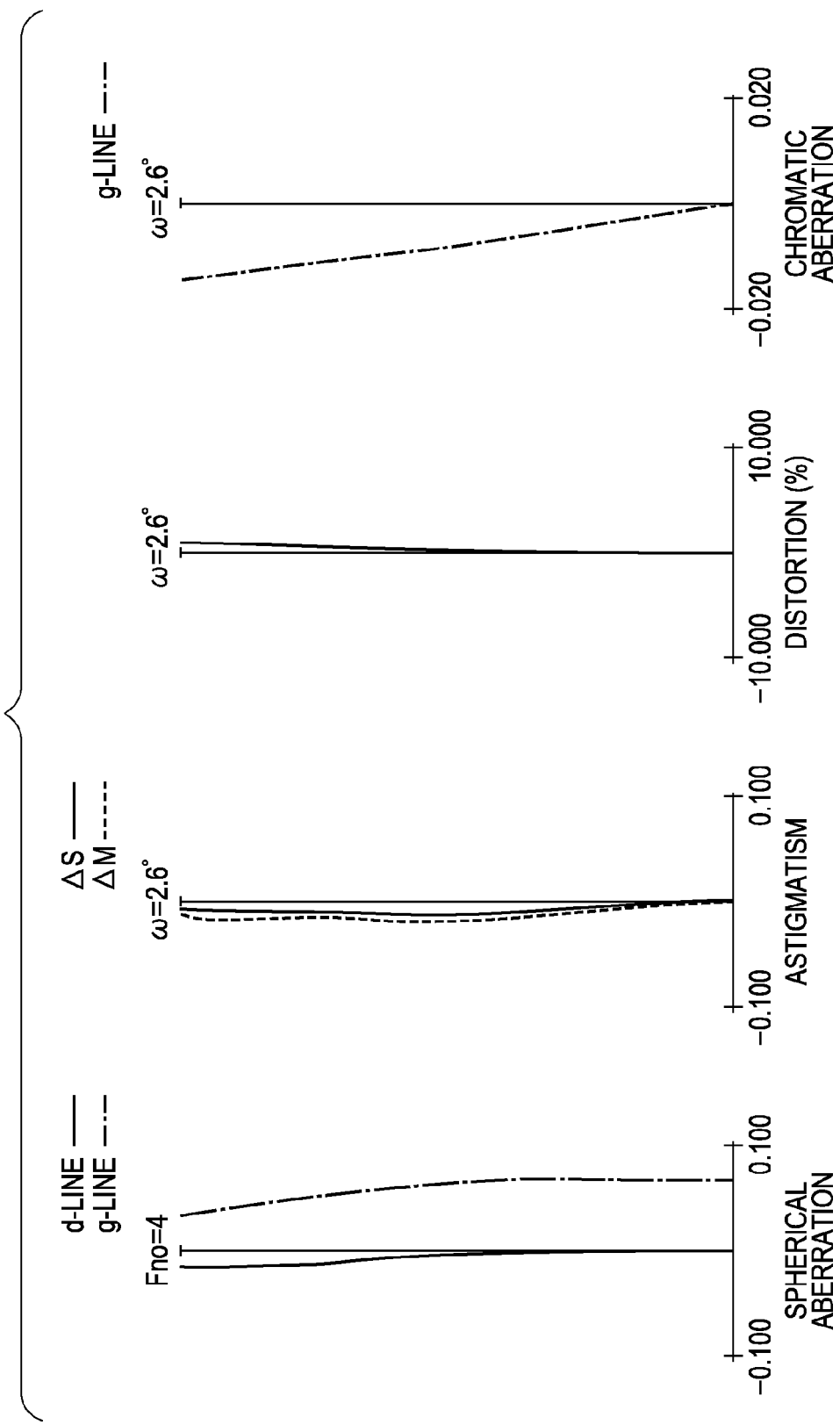
FIG. 8B is an aberration diagram, at the telephoto end, of the fourth embodiment of the present invention.
Figure 11:
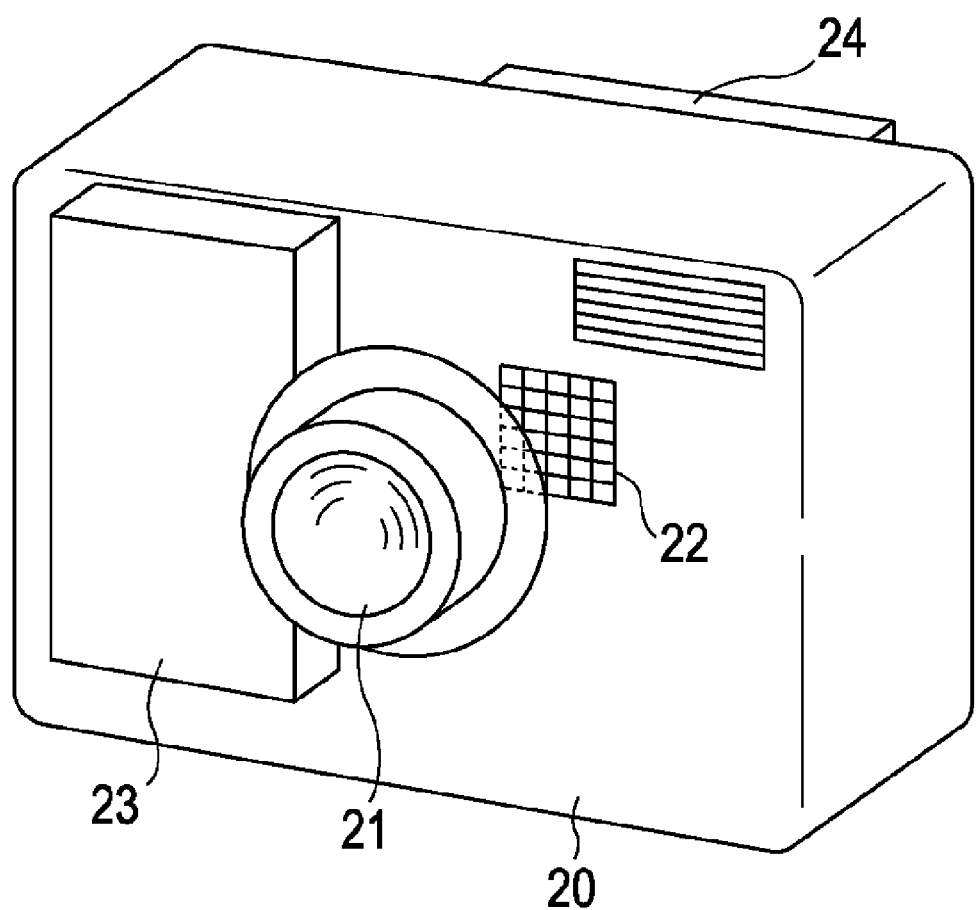
FIG. 11 is a schematic diagram of an image pickup apparatus including a zoom lens according to an embodiment of the present invention.

FIG. 1 is a cross-sectional view, at a wide-angle end (short focal length end), of a zoom lens according to a first embodiment of the present invention. FIG. 2A is a vertical aberration diagram, at the wide-angle end, of the first embodiment of the present invention, with the object distance at 3 meters. FIG. 2B is a vertical aberration diagram, at the telephoto end (long focal length end), of the first embodiment of the present invention, with the object distance at 3 meters. The object distance is a distance from an image plane to the position of the object being imaged. In the numerical examples described later, the object distance is expressed in mm. FIG. 3 is a cross-sectional view of a zoom lens, at the wide-angle end, according to a second embodiment of the present invention. FIG. 4A is a vertical aberration diagram, at the wide-angle end, of the second embodiment of the present invention, with the object distance at 3 meters. FIG. 4B is a vertical aberration diagram, at the telephoto end, of the second embodiment of the present invention, with the object distance at 3 meters. FIG. 5 is a cross-sectional view of a zoom lens, at the wide-angle end, according to a third embodiment of the present invention. FIG. 6A is a vertical aberration diagram, at the wide-angle end, of the third embodiment of the present invention, with the object distance at 3 meters. FIG. 6B is a vertical aberration diagram, at the telephoto end, of the third embodiment of the present invention, with the object distance at 3 meters. FIG. 7 is a cross-sectional view of a zoom lens, at the wide-angle end, according to a fourth embodiment of the present invention. FIG. 8A is a vertical aberration diagram, at the wide-angle end, of the fourth embodiment of the present invention, with the object distance at 3 meters. FIG. 8B is a vertical aberration diagram, at the telephoto end, of the fourth embodiment of the present invention, with the object distance at 3 meters. FIG. 9 is a cross-sectional view of a zoom lens, at the wide-angle end, according to a fifth embodiment of the present invention. FIG. 10A is a vertical aberration diagram, at the wide-angle end, of the fifth embodiment of the present invention, with the object distance at 3 meters. FIG. 10B is a vertical aberration diagram, at the telephoto end, of the fifth embodiment of the present invention, with the object distance at 3 meters. FIG. 11 is a schematic diagram of a relevant part of a video camera (image pickup apparatus) equipped with a zoom lens according to an embodiment of the present invention.

In the cross-sectional views of the lenses, the left is the object side (front), and the right is the image side (rear). The zoom lenses of the embodiments are image-taking optical systems for use in image pickup apparatuses, such as video cameras and digital cameras. In the cross-sectional views, reference sign L1 denotes a first lens unit having positive refractive power; L2 denotes a second lens unit having negative refractive power; L3 denotes a third lens unit having positive refractive power; L4 denotes a fourth lens unit having negative or positive refractive power; and L5 denotes a fifth lens unit having positive refractive power. Here, the refractive power is the reciprocal of optical power=focal length. Reference sign SP denotes an aperture stop, which is disposed at the object side of the third lens unit L3.

Reference sign P denotes an optical block corresponding to an optical filter, a faceplate, or the like. Reference sign I denotes an image pickup element. Reference sign IP denotes an image plane. When used as a photographic optical system of a video camera or a digital still camera, the image plane IP corresponds to the image pickup plane of a solid-state image pickup element (photoelectric conversion element), such as a CCD sensor and a CMOS sensor; and when used in a silver-halide film camera, IP corresponds to a photosurface, such as a film surface. In the aberration diagrams, reference sign d denotes d-line (wavelength: 587.56 nm); g denotes g-line (wavelength: 435.8 nm); ΔM denotes a meridional image plane; and ΔS denotes a sagittal image plane. Lateral chromatic aberration is indicated by g-line. Reference sign Fno denotes F-number; and w denotes a half angle of view. In the embodiments below, the wide-angle end and the telephoto end indicate zooming positions when a scaling lens unit (for example, the second lens unit L2) is respectively located at one of the two ends in a movable range on the optical axis of the system. The arrows extending away from the center of the drawings indicate the moving loci of the individual lens units, the aperture stop SP, and the image pickup element I (in FIGS. 3, 5, 7 and 9) during zooming from the wide-angle end to the telephoto end. Straight lines extending downward from the center of the drawings indicate that the illustrated unit (lens or otherwise) does not move when zooming from the wide-angle end to the telephoto end. The zoom lenses of the first to fourth embodiments (FIGS. 1, 3, 5 and 7) include, in order from the object side to the image side, the first lens unit L1 having positive refractive power, the second lens unit L2 having negative refractive power, the third lens unit L3 having positive refractive power, the fourth lens unit L4 having negative refractive power, and the fifth lens unit L5 having positive refractive power. The zoom lens of the fifth embodiment (FIG. 9) includes, in order from the object side to the image side, the first lens unit L1 having positive refractive power, the second lens unit L2 having negative refractive power, the third lens unit L3 having positive refractive power, the fourth lens unit L4 having positive refractive power, and the fifth lens unit L5 having positive refractive power.

In the zoom lenses of all of the embodiments, when zooming from the wide-angle end to the telephoto end, the second, third, and fifth lens units L2, L3, and L5 are moved as indicated by the arrows. Specifically, the second lens unit L2 is moved monotonically to the image side for scaling. The third lens unit L3 is moved to the object side, partly in a convex locus. The main scaling is performed using the second and third lens units L2 and L3. The fifth lens unit L5 is moved nonlinearly so as to correct changes in image point associated with scaling. The aperture stop SP is moved to the object side, partly in a convex locus, independently from the lens units. In the second to fifth embodiments, the image pickup element I is moved nonlinearly when zooming. Specifically, the image pickup element I is moved so that the interval between the first lens unit L1 and the image pickup element I is longer at the telephoto end than at the wide-angle end. The first lens unit L1 and the fourth lens unit L4 are not moved for zooming. The embodiments employ a rear focusing type in which the fifth lens unit L5 is moved on the optical axis for focusing. For example, at the telephoto end, focusing from an object at infinity to a near object is performed by moving the fifth lens unit L5 forward, as indicated by a straight line 5c in the drawings. A solid curve 5a and a dotted line 5b, shown in the drawings, which are the moving loci of the fifth lens unit L5, indicate moving loci for correcting variations of the image plane along with zooming from the wide-angle end to the telephoto end during focusing on an object at infinity and a near object, respectively. The moving locus of the fifth lens unit L5 during zooming depends on the object distance in this manner.

In the embodiments, the fourth lens unit L4 is constituted of a first sub lens unit L41 having negative refractive power and a second sub lens unit L42 having positive refractive power. The first sub lens unit L41 is moved in the direction indicated by the unlabeled double arrow so as to have a component perpendicular to the optical axis so that the position of an object image (imaging position) when the entire optical system vibrates is moved in the direction perpendicular to the optical axis to thereby correct image blur, that is, to perform image stabilization. This allows effective image stabilization without adding an optical element, such as a variable angle prism, and a new lens unit for image stabilization. In the embodiments, the third lens unit L3 is moved to a position closest to the object side in an intermediate zooming position (moved to the object side in a convex locus) so that off-axis light incident on the front lens in the intermediate zooming position is low. This allows the effective front lens diameter to be determined at the wide-angle end, thus making it easy to decrease the effective front lens diameter and reduce the size of the entire system.

In the embodiments, the aperture stop SP is provided between the second lens unit L2 and the third lens unit L3, and the aperture stop SP is moved on the optical axis independently from the lens units when zooming. The effective front lens diameter is influenced by the movement of the third lens unit L3 during zooming. Thus, by moving the aperture stop SP so that the distance between the first lens unit L1 and the aperture stop SP can be set short between the wide-angle end and an intermediate zooming position, the effective front lens diameter is further reduced. Specifically, the interval between the aperture stop SP and the third lens unit L3 is set wider at the wide-angle end than at the telephoto end. In the second to fifth embodiments, the image pickup element I is moved as described above for zooming. The effective front lens diameter is further decreased by moving the image pickup element I during zooming, as described above. Furthermore, the entire optical performance is improved by moving three or more lens units and the image pickup element I when zooming. The image pickup element I may be fixed during zooming. In the embodiments, a plurality of lenses are provided with optimum aspherical surfaces to maintain high optical performance.

In the embodiments, in the fourth lens unit L4, the first sub lens unit L41 is constituted of a lens 411 having negative refractive power and a lens 412 having positive or negative refractive power. Here, the embodiments satisfy the following conditions:

$$|f4/fw|>10.0 \quad (1)$$

$$v411>60.00 \quad (2)$$

$$v412<35.00 \quad (3)$$

where f4 is the focal length of the fourth lens unit L4, fw is the focal length of the entire system at the wide-angle end, v411 is the Abbe number of the material of the lens 411, and v412 is the Abbe number of the material of the lens 412. In the embodiments, the fourth lens unit L4 is constituted of two lens units, that is, the first sub lens unit L41 and the second sub lens unit L42, and the first sub lens unit L41 is moved to have a component perpendicular to the optical axis, thereby correcting displacement of an image when the zoom lens vibrates. Here, the fourth lens unit L4 conductive to image stabilization is not moved for zooming to effectively reduce the size of the image stabilizing mechanism. If the fourth lens unit L4 conductive to image stabilization is moved for zooming, the lens unit is moved along the optical axis together with a mechanism for driving the lens unit in the direction perpendicular to the optical axis for image stabilization, which is not appropriate for minimizing and simplifying the image stabilizing mechanism. Therefore, it is advantageous to set the power (refractive power) of the fourth lens unit L4 serving as an image-stabilizing lens unit small.

In the embodiments, the refractive power of the fourth lens unit L4 is specified so as to satisfy Conditional Expression (1). If Conditional Expression (1) is not satisfied, the ranges of movement of the third lens unit L3 and the fifth lens unit L5 during zooming are limited, thus making it difficult to obtain a high zoom ratio. Furthermore, a zoom ratio makes it difficult not to move the fourth lens unit L4 for zooming, thus disadvantageously complicating the mechanism. Meanwhile, if the power of the entire image-stabilizing lens unit is small, the amount of displacement during image stabilization increases, thus making it difficult to reduce the size. Thus, in the embodiments, the fourth lens unit L4 is constituted of the first sub lens unit L41 having negative refractive power and the second sub lens unit L42 having positive refractive power, both of which are given appropriate power. The object-side first sub lens unit L41 is moved so as to have a component perpendicular to the optical axis, thereby correcting displacement of an image when the zoom lens vibrates. This allows image stabilization to be achieved only by some lens unit in the fourth lens unit L4, thereby achieving reduction of the weight and size of the image-stabilizing lens unit. The lens 411 and the lens 412 that constitute the first sub lens unit L41 are configured such that the Abbe numbers of the materials thereof satisfy Conditional Expressions (2) and (3). The two Conditional Expressions (2) and (3) are effective in obtaining high image stabilizing function even if the telephoto-end focal length is set sufficiently long. If Conditional Expressions (2) and (3) are not satisfied, chromatic aberration disadvantageously often occurs at the telephoto end during image stabilization. More preferably, the numerical ranges of Conditional Expressions (1) to (3) are set as follows:

$$|f4/fw|>11.0 \quad (1a)$$

$$v411>70.00 \quad (2a)$$

$$v412<25.00 \quad (3a)$$

According to the embodiments with the above configuration, zoom lenses in which the entire optical system is compact and which has high optical performance also during image stabilization. More preferably, the embodiments satisfy one or more of the following conditional expressions:

$$|f4/f5|>2.00 \quad (4)$$

$$0.50<|f41/f42|<1.20 \quad (5)$$

$$-2.50<(1-|41T|) \cdot \beta 42T \cdot \beta 5T<-0.55 \quad (6)$$

$$r411a<0 \quad (7)$$

$$\beta 3T/\beta 3W>1.3 \quad (8)$$

where f5 is the focal length of the fifth lens unit L5; f41 is the focal length of the first sub lens unit L41; f42 is the focal length of the second sub lens unit L42; β41T is the imaging magnification of the first sub lens unit L41 at the telephoto end; β42T is the imaging magnification of the second sub lens unit L42 at the telephoto end; β5T is the imaging magnification of the fifth lens unit L5 at the telephoto end; r411a is the radius of curvature, at the object-side surface, of the lens 411; β3w is the imaging magnification of the third lens unit L3 at the wide-angle end; and β3T is the imaging magnification of the third lens unit L3 at the telephoto end. In the embodiments, preferably, the power of the fourth lens unit L4 is set small to minimize and simplify the image stabilizing mechanism, and the power of the fifth lens unit L5 is set so that focus movement is optimized and the exit pupil is substantially telecentric. Conditional Expression (4) is about the power of the fourth and fifth lens units L4 and L5, for appropriately setting the relationship between the focal length of the fifth lens unit L5 and the focal length of the fourth lens unit L4.

If Conditional Expression (4) is not satisfied, the power of the fifth lens unit L5 is reduced, which increases the movement for focusing with the fifth lens unit L5, thus disadvantageously not only increasing the size of the entire system but also reducing the exit pupil relative to the image pickup element. Furthermore, the power of the fourth lens unit L4 is set small, and the first sub lens unit L41 having negative refractive power and the second sub lens unit L42 having positive refractive power of the fourth lens unit L4 are given appropriate power. The object-side first sub lens unit L41 is moved so as to have a component perpendicular to the optical axis, thereby correcting displacement of an image when the zoom lens vibrates. This provides a configuration capable of achieving image stabilization using only some lens unit in the fourth lens unit L4, thereby reducing the weight and size of the image-stabilizing lens unit. Conditional Expression (5) is for appropriately setting the ratio of the refractive power of the first sub lens unit L41 to the refractive power of the second sub lens unit L42. If the ratio of f41 to f42 falls below the lower limit of Conditional Expression (5), the power of the first sub lens unit L41 becomes relatively large, thus making it difficult to ensure good image stabilizing function. If the ratio of f41 to f42 exceeds the upper limit, the movement of the lens for image stabilization disadvantageously increases.

Conditional Expression (6) is about the imaging magnifications of the first sub lens unit L41 and the second sub lens unit L42, which are image-stabilizing lens units, and the fifth lens unit L5. Conditional Expression (6) is for appropriately setting the vibration control sensitivity of the first sub lens unit L41. Conditional Expression (6) expresses the ratio of the amount of vertical travel of the first sub lens unit L41 from the optical axis to the amount of travel of an image point on an image plane along therewith. If the ratio falls below the lower limit of Conditional Expression (6), the vibration control sensitivity of the first sub lens unit L41 becomes too low and increases the amount of travel for image stabilization, which increases the size of the first sub lens unit L41, thus increasing the size of the image stabilizing mechanism. In contrast, if the ratio exceeds the upper limit, the vibration control sensitivity becomes too high, thus disadvantageously making it difficult to control image stabilization. Furthermore, in order to improve the optical performance during image stabilization, it is effective to configure the object-side lens surface of the lens 411 having negative refractive power, which constitutes the image stabilizing first sub lens unit L41, to be concentric with the aperture stop SP. Conditional Expression (7) is for appropriately setting the radius of curvature r411a of the object-side lens surface of the lens 411 in this case. If Conditional Expression (7) is not satisfied, the optical performance during image stabilization can hardly be maintained well. It is important for a high zoom ratio to appropriately set the share of zooming ratio of a magnification-varying lens unit.

Conditional Expression (8) is for achieving a high zoom ratio by appropriately setting the magnification β3W of the third lens unit L3 at the wide-angle end and the imaging magnification β3T of the third lens unit L3 at the telephoto end. If Conditional Expression (8) is not satisfied, the share of zooming ratio of the second lens unit L2, which is the main zoom lens unit, increases, so that the amount of travel of the second lens unit L2 at the object side relative to the aperture stop SP increases in order to obtain a desired zoom ratio, thus disadvantageously increasing the size. More preferably, the numerical ranges of Conditional Expressions (4) to (6) and (8) are set as follows:

$$2.10<|f4/f5|<4.00 \quad (4a)$$

$$0.55<|f41/f42|<1.15 \quad (5a)$$

$$-2.00<(1-\beta 41T)\cdot\beta 42T\cdot\beta 5T<-0.70 \quad (6a)$$

$$1.3<\beta 3T/\beta 3W<2.0 \quad (8a)$$

The first lens unit L1 is constituted of, in order from the object side to the image side, a cemented lens made up of a negative lens and a positive lens, a positive lens, and a positive lens. This lens configuration allows colors in longitudinal chromatic aberration and lateral chromatic aberration to be erased well and spherical aberration to be corrected in spite of a high zoom ratio. The second lens unit L2 is constituted of four lenses, that is, in order from the object side to the image side, a negative lens having a concave shape at the image side, a cemented lens in which a negative lens and a positive lens are cemented together, and a positive lens. Thus, variations of aberrations associated with zooming are corrected. The third lens unit L3 is constituted of four lenses, that is, in order from the object side to the image side, a positive lens having a convex surface at the object side, a meniscus negative lens having a concave surface at the image side, and a cemented lens in which a negative lens and a positive lens are cemented together. The first sub lens unit L41 is constituted of a negative lens, a positive lens or a negative lens, and a negative lens. The second sub lens unit L42 is constituted of a cemented lens in which a positive lens and a negative lens are cemented together or a cemented lens in which a negative lens and a positive lens are cemented together. The fifth lens unit L5 is constituted of a positive lens and a cemented lens in which a positive lens and a negative lens are cemented together.

Next, values for Numerical Examples 1 to 5 corresponding to the first to fifth embodiments of the present invention, respectively, are shown. In the numerical examples, reference sign i (where i=1, 2, 3 . . . ) denotes the number of a surface counted from the object side; ri denotes the radius of curvature of the ith optical surface (ith surface); di denotes the interval along the optical axis between the ith surface and the (i+1)th surface; ndi denotes the refractive index of the material of the ith optical element with respect to d-line; and νdi denotes the Abbe number of the material of the ith optical element with respect to d-line. Focal length and F-number are shown for wide angle (wide-angle end), intermediate (intermediate zooming position), and telephoto (telephoto end). Spherical surfaces are marked with an asterisk (*) on the side of the surface number. Displacement X, in the direction of the optical axis, of an aspherical surface at a height of H from the optical axis with respect to a surface vertex is expressed as:

$$X=(H^2/R)/[1+\{1-(1+K)(H/R)^2\}^{1/2}]+A3H^3+A4H^4+A5H^5+A6H^6+A7H^7+A8H^8+A9H^9+A10H^{10}+A11H^{11}+A12H^{12}$$

where R is the paraxial radius of curvature, K is eccentricity, and A3, A4, A5, A6, A7, A8, A9, A10, A11, and A12 are aspherical coefficients. "e±XX" in the aspherical coefficients means "×10$^{\pm XX}$". The last two surfaces in the numerical examples are the surfaces of optical blocks, such as a filter and a faceplate. In the numerical examples, back focus (BF) is a distance from the last lens surface to a paraxial image plane, expressed as a length in air. The entire lens length is the sum of a back focus and the distance from a surface closest to the object to the last surface. Table 1 shows the relationship between the above-described conditional expressions and the numerical examples.

NUMERICAL EXAMPLE 1

| Surface number i | ri | di | ndi | vdi |
|---|---|---|---|---|
| 1 | 83.736 | 1.70 | 2.00330 | 28.3 |
| 2 | 52.873 | 8.00 | 1.43875 | 95.0 |
| 3 | 760.443 | 0.10 | | |
| 4 | 70.211 | 4.00 | 1.43875 | 95.0 |
| 5 | 270.478 | 0.10 | | |
| 6 | 48.129 | 5.40 | 1.61800 | 63.3 |
| 7 | 231.837 | (Variable) | | |
| 8 | −525.607 | 0.85 | 1.88300 | 40.8 |
| 9* | 13.087 | 6.50 | | |
| 10 | −36.178 | 2.20 | 1.84666 | 23.9 |
| 11 | −19.957 | 0.65 | 1.74100 | 52.6 |
| 12 | 34.277 | 0.71 | | |
| 13 | 27.096 | 2.65 | 1.84666 | 23.9 |
| 14 | 389.639 | (Variable) | | |
| 15 (Aperture) | ∞ | (Variable) | | |
| 16* | 15.511 | 4.50 | 1.80440 | 39.6 |
| 17 | 84.076 | 2.24 | | |
| 18* | 32.873 | 1.00 | 2.00330 | 28.3 |
| 19 | 12.308 | 2.23 | | |
| 20 | 15.965 | 0.80 | 1.80809 | 22.8 |
| 21 | 13.364 | 4.40 | 1.49700 | 81.5 |
| 22 | −38.108 | (Variable) | | |
| 23 | −27.732 | 0.90 | 1.49700 | 81.5 |
| 24 | 19.982 | 1.51 | | |
| 25* | 125.427 | 1.20 | 1.94595 | 18.0 |
| 26 | 191.066 | 0.49 | | |
| 27 | 33.711 | 3.50 | 1.49700 | 81.5 |
| 28 | −19.761 | 0.60 | 1.83400 | 37.2 |
| 29 | −29.816 | (Variable) | | |
| 30* | 23.472 | 2.50 | 1.48749 | 70.2 |
| 31 | 74.193 | 1.39 | | |
| 32 | 72.522 | 4.00 | 1.49700 | 81.5 |
| 33 | −23.195 | 0.65 | 1.83400 | 37.2 |
| 34 | −42.150 | (Variable) | | |
| 35 | ∞ | 2.46 | 1.51633 | 64.1 |
| 36 | ∞ | 2.11 | | |
| Image plane | ∞ | | | |

Aspherical surface data

Ninth surface

| | | |
|---|---|---|
| K = 2.76765e−001 | A4 = −1.72987e−005 | A6 = −4.96486e−007 |
| A8 = −1.95692e−009 | A10 = 1.29891e−010 | A12 = −1.08351e−012 |
| A3 = −8.49536e−006 | A5 = −1.17345e−006 | A7 = 1.10811e−007 |
| A9 = −2.08493e−009 | A11 = 1.14142e−011 | |

16th surface

| | | |
|---|---|---|
| K = −4.72506e−001 | A4 = 4.61917e−006 | A6 = −7.95137e−008 |
| A8 = −5.39480e−010 | A10 = 1.17205e−011 | A12 = −3.16031e−014 |
| A3 = 9.95469e−006 | A5 = 7.64657e−007 | A7 = 1.23783e−008 |
| A9 = −1.13614e−010 | A11 = 9.65869e−014 | |

18th surface

| | | |
|---|---|---|
| K = −9.59955e+000 | A4 = 2.12221e−005 | A6 = −2.63183e−007 |
| A8 = 1.17849e−009 | A10 = 1.29976e−011 | A12 = −1.64464e−014 |
| A3 = −1.31127e−005 | A5 = 1.81866e−007 | A7 = 1.49153e−008 |
| A9 = −1.58846e−010 | A11 = −2.75726e−013 | |

25th surface

| | | |
|---|---|---|
| K = 3.51798e+001 | A4 = 1.33372e−005 | A6 = 1.28370e−007 |
| A8 = 2.06977e−009 | A10 = 1.92762e−010 | A12 = −2.44507e−013 |
| A3 = 5.38623e−006 | A5 = −6.86367e−007 | A7 = 8.26172e−009 |
| A9 = −1.54024e−009 | A11 = −4.67100e−012 | |

30th surface

| | | |
|---|---|---|
| K = −2.36783e−002 | A4 = −5.08054e−006 | A6 = −5.61272e−008 |
| A8 = 2.53542e−009 | A10 = 3.59195e−012 | A12 = 2.69804e−016 |
| A3 = −3.53540e−006 | A5 = 1.87389e−007 | A7 = −2.02855e−009 |
| A9 = −2.38510e−010 | A11 = 2.33887e−013 | |

| | Wide-angle end | Intermediate point | Telephoto end |
|---|---|---|---|
| Focal length | 7.85 | 17.74 | 108.51 |
| F-NUMBER | 1.85 | 2.70 | 4.00 |
| Angle of view | 38.59 | 19.56 | 3.36 |
| Image height | 5.58 | 6.30 | 6.37 |
| Entire lens length | 156.32 | 156.32 | 156.32 |
| BF | 2.11 | 2.11 | 2.11 |
| d7 | 1.50 | 12.31 | 40.79 |
| d14 | 41.03 | 29.07 | 4.38 |
| d15 | 19.03 | 10.39 | 9.37 |
| d22 | 0.96 | 10.75 | 7.98 |
| d29 | 13.48 | 17.81 | 15.24 |
| d34 | 10.98 | 6.66 | 9.23 |

NUMERICAL EXAMPLE 2

| Surface number i | ri | di | ndi | vdi | effective diameter |
|---|---|---|---|---|---|
| 1 | 85.376 | 1.70 | 2.00330 | 28.3 | 51.92 |
| 2 | 56.607 | 5.60 | 1.43875 | 95.0 | 48.57 |
| 3 | 602.470 | 0.10 | | | 48.45 |
| 4 | 81.647 | 3.10 | 1.43875 | 95.0 | 47.67 |
| 5 | 261.724 | 0.10 | | | 47.45 |
| 6 | 49.493 | 4.80 | 1.59240 | 68.3 | 45.55 |
| 7 | 203.643 | (Variable) | | | 45.24 |
| 8 | 416.664 | 0.85 | 1.88300 | 40.8 | 25.17 |
| 9* | 12.530 | 7.07 | | | 19.02 |
| 10 | −25.093 | 2.20 | 1.84666 | 23.9 | 18.36 |
| 11 | −17.982 | 0.65 | 1.74100 | 52.6 | 18.45 |
| 12 | 40.576 | 1.05 | | | 18.44 |
| 13 | 34.673 | 2.65 | 1.84666 | 23.9 | 18.90 |
| 14 | −141.301 | (Variable) | | | 18.82 |
| 15 (Aperture) | ∞ | (Variable) | | | 14.97 |
| 16* | 15.259 | 4.50 | 1.81600 | 46.6 | 19.79 |
| 17 | 85.331 | 2.63 | | | 18.97 |
| 18* | 30.532 | 1.00 | 2.00330 | 28.3 | 16.43 |
| 19 | 12.248 | 2.02 | | | 14.85 |
| 20 | 16.382 | 0.80 | 1.80518 | 25.4 | 15.07 |
| 21 | 13.696 | 4.40 | 1.49700 | 81.5 | 14.67 |
| 22 | −37.363 | (Variable) | | | 14.37 |
| 23 | −30.606 | 0.90 | 1.49700 | 81.5 | 13.84 |
| 24 | 22.568 | 1.10 | | | 14.28 |
| 25* | 98.982 | 1.20 | 1.94595 | 18.0 | 14.46 |
| 26 | 277.961 | 0.72 | | | 14.71 |
| 27 | 38.844 | 3.30 | 1.49700 | 81.5 | 15.50 |
| 28 | −18.881 | 0.60 | 1.83400 | 37.2 | 15.68 |
| 29 | −31.459 | (Variable) | | | 16.11 |
| 30* | 28.865 | 1.70 | 1.48749 | 70.2 | 18.52 |
| 31 | 56.755 | 1.03 | | | 18.43 |
| 32 | 59.708 | 3.30 | 1.49700 | 81.5 | 18.44 |
| 33 | −24.180 | 0.65 | 1.83400 | 37.2 | 18.36 |

-continued

| | | | | | |
|---|---|---|---|---|---|
| 34 | −48.374 | (Variable) | | | 18.48 |
| 35 | ∞ | 2.46 | 1.51633 | 64.1 | 25.00 |
| 36 | ∞ | 1.93 | | | 25.00 |
| Image plane | ∞ | | | | |

Aspherical surface data

Ninth surface

K = 1.91153e−001     A4 = −1.50963e−005     A6 = −4.44649e−007
A8 = −3.59083e−009   A10 = 1.38324e−010     A12 = −1.08272e−012
A3 = −8.16826e−006   A5 = −1.53325e−006     A7 = 1.23776e−007
A9 = −2.10347e−009   A11 = 1.15685e−011

16th surface

K = −4.79089e−001    A4 = 4.20451e−006      A6 = −7.97995e−008
A8 = −5.70670e−010   A10 = 1.11759e−011     A12 = −3.04889e−014
A3 = 4.15921e−006    A5 = 5.94087e−007      A7 = 1.31541e−008
A9 = −1.06769e−010   A11 = 1.04684e−013

18th surface

K = −8.63108e+000    A4 = 2.10764e−005      A6 = −2.50356e−007
A8 = 1.28332e−009    A10 = 6.26618e−012     A12 = 6.82258e−014
A3 = −4.95445e−006   A5 = −4.60041e−008     A7 = 1.52212e−008
A9 = −1.40631e−010   A11 = −8.47521e−013

25th surface

K = 2.12748e+001     A4 = 1.51208e−005      A6 = 1.25521e−007
A8 = 2.31269e−009    A10 = 1.93979e−010     A12 = −2.12162e−013
A3 = −7.15376e−006   A5 = −1.11615e−006     A7 = 5.75057e−009
A9 = −1.45382e−009   A11 = −6.14722e−012

30th surface

K = −4.35563e−002    A4 = −4.47496e−006     A6 = 2.02864e−008
A8 = 1.54130e−009    A10 = 7.57857e−012     A12 = 1.29642e−015
A3 = 1.63742e−005    A5 = 1.97738e−007      A7 = −4.82207e−009
A9 = −1.69235e−010   A11 = −2.07920e−013

| | Wide-angle end | Intermediate point | Telephoto end |
|---|---|---|---|
| Focal length | 7.28 | 15.52 | 140.90 |
| F-NUMBER | 1.85 | 2.70 | 4.00 |
| Angle of view | 41.95 | 22.30 | 2.59 |
| Image height | 5.58 | 6.37 | 6.37 |
| Entire lens length | 135.61 | 134.71 | 153.47 |
| BF | 1.93 | 1.93 | 1.93 |
| d7 | 0.84 | 11.55 | 49.15 |
| d14 | 35.93 | 26.05 | 1.96 |
| d15 | 16.48 | 5.47 | 1.96 |
| d22 | 1.16 | 11.36 | 1.34 |
| d29 | 5.00 | 6.95 | 21.30 |
| d34 | 12.09 | 9.23 | 13.65 |

NUMERICAL EXAMPLE 3

| Surface number i | ri | di | ndi | vdi | effective diameter |
|---|---|---|---|---|---|
| 1 | 83.843 | 1.70 | 2.00330 | 28.3 | 52.13 |
| 2 | 55.928 | 5.60 | 1.43875 | 95.0 | 48.65 |
| 3 | 544.591 | 0.10 | | | 48.06 |
| 4 | 79.186 | 3.10 | 1.43875 | 95.0 | 47.34 |
| 5 | 238.861 | 0.10 | | | 47.12 |
| 6 | 49.775 | 4.80 | 1.59240 | 68.3 | 45.36 |
| 7 | 205.265 | (Variable) | | | 45.01 |
| 8 | 457.865 | 0.85 | 1.88300 | 40.8 | 25.26 |
| 9* | 12.503 | 7.12 | | | 19.08 |
| 10 | −24.919 | 2.20 | 1.86148 | 25.7 | 18.48 |
| 11 | −15.733 | 0.65 | 1.74100 | 52.6 | 18.56 |
| 12 | 39.848 | 1.04 | | | 18.53 |
| 13 | 34.028 | 2.65 | 1.86148 | 25.7 | 18.99 |
| 14 | −169.406 | (Variable) | | | 18.90 |
| 15 (Aperture) | ∞ | (Variable) | | | 14.94 |
| 16* | 15.410 | 4.50 | 1.81600 | 46.6 | 19.73 |
| 17 | 87.904 | 2.61 | | | 18.90 |
| 18* | 30.799 | 1.00 | 2.00330 | 28.3 | 16.43 |

-continued

| | | | | | |
|---|---|---|---|---|---|
| 19 | 12.349 | 1.97 | | | 14.87 |
| 20 | 16.547 | 0.80 | 1.80518 | 25.4 | 15.09 |
| 21 | 13.888 | 4.40 | 1.49700 | 81.5 | 14.70 |
| 22 | −36.826 | (Variable) | | | 14.40 |
| 23 | −29.953 | 0.90 | 1.49700 | 81.5 | 15.00 |
| 24 | 22.628 | 1.09 | | | 15.00 |
| 25* | 100.776 | 1.20 | 1.94595 | 18.0 | 15.00 |
| 26 | 312.627 | 0.70 | | | 15.00 |
| 27 | 38.905 | 3.30 | 1.49700 | 81.5 | 15.55 |
| 28 | −18.789 | 0.60 | 1.83400 | 37.2 | 15.73 |
| 29 | −31.308 | (Variable) | | | 16.16 |
| 30* | 30.108 | 1.70 | 1.48749 | 70.2 | 18.51 |
| 31 | 62.273 | 1.07 | | | 18.43 |
| 32 | 59.714 | 3.30 | 1.49700 | 81.5 | 18.44 |
| 33 | −23.460 | 0.65 | 1.83400 | 37.2 | 18.37 |
| 34 | −47.254 | (Variable) | | | 18.50 |
| 35 | ∞ | 2.46 | 1.51633 | 64.1 | 25.00 |
| 36 | ∞ | 2.01 | | | 25.00 |
| Image plane | ∞ | | | | |

Aspherical surface data

Ninth surface

K = 1.82877e−001     A4 = −1.38135e−005     A6 = −4.27904e−007
A8 = −3.84416e−009   A10 = 1.36653e−010     A12 = −1.07214e−012
A3 = −8.57947e−006   A5 = −1.65245e−006     A7 = 1.25045e−007
A9 = −2.07416e−009   A11 = 1.14734e−011

16th surface

K = −5.11570e−001    A4 = 4.40138e−006      A6 = −8.37467e−008
A8 = −5.95022e−010   A10 = 1.15829e−011     A12 = −3.43721e−014
A3 = 5.47182e−006    A5 = 6.71041e−007      A7 = 1.31884e−008
A9 = −1.09820e−010   A11 = 1.31950e−013

18th surface

K = −8.62746e+000    A4 = 2.16703e−005      A6 = −2.46714e−007
A8 = 1.10837e−009    A10 = 4.48143e−012     A12 = 8.96790e−014
A3 = −6.57131e−006   A5 = −1.04422e−007     A7 = 1.68634e−008
A9 = −1.11232e−010   A11 = −1.03346e−012

25th surface

K = 1.39013e+001     A4 = 1.60279e−005      A6 = 1.18476e−007
A8 = 2.91433e−009    A10 = 1.92628e−010     A12 = −2.22005e−013
A3 = −7.51648e−006   A5 = −1.04219e−006     A7 = 4.81696e−009
A9 = −1.51857e−009   A11 = −5.70142e−012

30th surface

K = −8.92641e−002    A4 = −3.26602e−006     A6 = 2.28668e−008
A8 = 1.61469e−009    A10 = 1.30041e−011     A12 = −2.51607e−014
A3 = 1.78340e−005    A5 = 1.26880e−007      A7 = −3.73633e−009
A9 = −2.29719e−010   A11 = −2.83622e−014

| | Wide-angle end | Intermediate point | Telephoto end |
|---|---|---|---|
| Focal length | 7.28 | 16.09 | 140.96 |
| F-NUMBER | 1.85 | 2.70 | 4.00 |
| Angle of view | 41.95 | 21.59 | 2.59 |
| Image height | 5.58 | 6.37 | 6.37 |
| Entire lens length | 135.94 | 135.46 | 153.45 |
| BF | 2.01 | 2.01 | 2.01 |
| d7 | 0.87 | 11.99 | 49.19 |
| d14 | 36.09 | 22.94 | 1.98 |
| d15 | 16.56 | 8.10 | 1.95 |
| d22 | 1.15 | 11.63 | 1.55 |
| d29 | 4.99 | 7.73 | 21.29 |
| d34 | 12.12 | 8.90 | 13.33 |

NUMERICAL EXAMPLE 4

| Surface number i | ri | di | ndi | vdi | effective diameter |
|---|---|---|---|---|---|
| 1 | 79.662 | 1.70 | 2.00330 | 28.3 | 50.48 |
| 2 | 55.397 | 5.80 | 1.43875 | 95.0 | 48.31 |

-continued

| | | | |
|---|---|---|---|
| 3 | 582.889 | 0.10 | | | 48.16 |
| 4 | 78.104 | 3.10 | 1.43875 | 95.0 | 47.34 |
| 5 | 206.725 | 0.10 | | | 47.06 |
| 6 | 51.396 | 4.80 | 1.59240 | 68.3 | 45.40 |
| 7 | 208.025 | (Variable) | | | 44.95 |
| 8 | 478.061 | 0.85 | 2.00330 | 28.3 | 24.05 |
| 9* | 13.400 | 6.55 | | | 18.85 |
| 10 | −25.196 | 2.12 | 1.92286 | 18.9 | 18.32 |
| 11 | −15.953 | 0.65 | 1.74100 | 52.6 | 18.44 |
| 12 | 36.734 | 1.13 | | | 18.40 |
| 13 | 32.976 | 2.65 | 1.84666 | 23.9 | 18.92 |
| 14 | −142.740 | (Variable) | | | 18.85 |
| 15 (Aperture) | ∞ | (Variable) | | | 15.41 |
| 16* | 15.380 | 4.70 | 1.83481 | 42.7 | 19.76 |
| 17 | 132.012 | 2.03 | | | 18.92 |
| 18* | 30.608 | 1.00 | 2.00069 | 25.5 | 16.58 |
| 19 | 12.195 | 2.09 | | | 14.90 |
| 20 | 16.700 | 0.80 | 1.83400 | 37.2 | 15.00 |
| 21 | 12.814 | 4.40 | 1.49700 | 81.5 | 14.49 |
| 22 | −42.932 | (Variable) | | | 14.16 |
| 23 | −29.633 | 1.00 | 1.49700 | 81.5 | 13.64 |
| 24 | 23.636 | 0.89 | | | 14.12 |
| 25* | 83.545 | 1.40 | 1.94595 | 18.0 | 14.23 |
| 26 | 151.091 | 0.81 | | | 14.53 |
| 27 | 38.964 | 3.33 | 1.49700 | 81.5 | 15.36 |
| 28 | −19.042 | 0.60 | 1.83400 | 37.2 | 15.57 |
| 29 | −31.119 | (Variable) | | | 16.00 |
| 30* | 31.116 | 1.70 | 1.48749 | 70.2 | 18.62 |
| 31 | 64.686 | 0.77 | | | 18.55 |
| 32 | 47.335 | 3.95 | 1.49700 | 81.5 | 18.57 |
| 33 | −20.349 | 0.65 | 1.83400 | 37.2 | 18.48 |
| 34 | −43.932 | (Variable) | | | 18.65 |
| 35 | ∞ | 2.46 | 1.51633 | 64.1 | 25.00 |
| 36 | ∞ | 1.69 | | | 25.00 |
| Image plane | ∞ | | | | |

Aspherical surface data

Ninth surface

K = 3.78236e−001    A4 = −2.36521e−005    A6 = −6.47622e−007
A8 = 9.24057e−010    A10 = 1.17099e−010    A12 = −9.64378e−013
A3 = −4.84718e−006   A5 = 3.27503e−007    A7 = 1.00080e−007
A9 = −2.06991e−009   A11 = 1.01586e−011

16th surface

K = −6.11323e−001    A4 = 6.67210e−006    A6 = −9.87431e−008
A8 = −7.63307e−010   A10 = 1.03375e−011   A12 = −1.74626e−014
A3 = 3.32407e−006    A5 = 2.23732e−007    A7 = 1.85740e−008
A9 = −1.24005e−010   A11 = 1.18671e−014

18th surface

K = −9.30122e+000    A4 = 2.73588e−005    A6 = −2.40327e−007
A8 = −5.43808e−010   A10 = 1.97497e−012   A12 = 1.55877e−014
A3 = −1.91273e−006   A5 = 7.26764e−007    A7 = 1.13335e−008
A9 = 1.73854e−010    A11 = −9.77429e−013

25th surface

K = −1.26072e+000    A4 = 1.65043e−005    A6 = 8.35351e−008
A8 = 7.49988e−010    A10 = 2.90374e−010   A12 = 1.49029e−012
A3 = −8.26527e−006   A5 = −5.64440e−007   A7 = −4.42219e−009
A9 = −8.71323e−010   A11 = −3.55982e−011

30th surface

K = 1.01663e+000     A4 = −3.59004e−006   A6 = 4.62769e−009
A8 = 1.34026e−010    A10 = 1.25828e−012   A12 = −1.60867e−013
A3 = 1.07705e−005    A5 = −2.39973e−007   A7 = 9.70039e−009
A9 = −1.80292e−010   A11 = 2.51508e−012

| | Wide-angle end | Intermediate point | Telephoto end |
|---|---|---|---|
| Focal length | 7.28 | 15.41 | 141.00 |
| F-NUMBER | 1.85 | 2.70 | 4.00 |
| Angle of view | 41.95 | 22.44 | 2.58 |
| Image height | 5.58 | 6.37 | 6.37 |
| Entire lens length | 135.28 | 135.48 | 153.05 |
| BF | 1.69 | 1.69 | 1.69 |
| d7 | 0.98 | 11.74 | 49.30 |
| d14 | 37.71 | 21.02 | 1.98 |
| d15 | 14.60 | 11.12 | 1.95 |
| d22 | 1.27 | 10.68 | 1.33 |
| d29 | 5.04 | 7.79 | 20.75 |
| d34 | 11.86 | 9.32 | 13.92 |

NUMERICAL EXAMPLE 5

| Surface number i | ri | di | ndi | vdi | effective diameter |
|---|---|---|---|---|---|
| 1 | 83.562 | 1.70 | 2.00330 | 28.3 | 54.07 |
| 2 | 56.398 | 6.20 | 1.43875 | 95.0 | 50.86 |
| 3 | 394.511 | 0.10 | | | 49.95 |
| 4 | 88.215 | 3.10 | 1.43875 | 95.0 | 46.71 |
| 5 | 334.269 | 0.10 | | | 46.11 |
| 6 | 53.160 | 4.60 | 1.59240 | 68.3 | 43.91 |
| 7 | 260.787 | (Variable) | | | 43.41 |
| 8 | 4745.268 | 0.85 | 1.88300 | 40.8 | 25.95 |
| 9* | 14.107 | 7.09 | | | 20.30 |
| 10 | −33.494 | 3.00 | 1.86148 | 25.7 | 19.74 |
| 11 | −15.886 | 0.65 | 1.74100 | 52.6 | 19.81 |
| 12 | 45.602 | 0.87 | | | 19.61 |
| 13 | 32.484 | 2.65 | 1.86148 | 25.7 | 19.98 |
| 14 | 176.422 | (Variable) | | | 19.76 |
| 15 (Aperture) | ∞ | (Variable) | | | 15.94 |
| 16* | 14.929 | 4.50 | 1.81600 | 46.6 | 20.13 |
| 17 | 69.520 | 2.95 | | | 19.30 |
| 18* | 30.638 | 1.00 | 2.00330 | 28.3 | 16.52 |
| 19 | 11.991 | 1.96 | | | 14.86 |
| 20 | 16.897 | 0.80 | 1.80809 | 22.8 | 15.07 |
| 21 | 14.775 | 4.50 | 1.49700 | 81.5 | 14.74 |
| 22 | −64.881 | (Variable) | | | 14.36 |
| 23 | −36.839 | 0.80 | 1.49700 | 81.5 | 14.30 |
| 24 | 51.149 | 0.80 | | | 14.00 |
| 25* | 138.113 | 1.10 | 1.94595 | 18.0 | 16.20 |
| 26 | 75.926 | 0.73 | | | 14.00 |
| 27 | 54.631 | 1.00 | 1.49700 | 81.5 | 15.72 |
| 28 | 52.329 | 2.50 | 1.81600 | 46.6 | 16.02 |
| 29* | −52.132 | (Variable) | | | 16.25 |
| 30* | 21.501 | 2.00 | 1.48749 | 70.2 | 17.48 |
| 31 | 45.804 | 1.50 | | | 17.25 |
| 32 | −87.396 | 3.60 | 1.49700 | 81.5 | 17.21 |
| 33 | −19.375 | 0.65 | 1.83400 | 37.2 | 17.12 |
| 34 | −34.000 | (Variable) | | | 17.34 |
| 35 | ∞ | 2.46 | 1.51633 | 64.1 | 25.00 |
| 36 | ∞ | 1.08 | | | 25.00 |
| Image plane | ∞ | | | | |

Aspherical surface data

Ninth surface

K = 3.85868e−001     A4 = −1.19955e−005   A6 = −3.85955e−007
A8 = −3.54880e−009   A10 = 1.24378e−010   A12 = −1.01844e−012
A3 = −1.16222e−005   A5 = −1.54256e−006   A7 = 1.20701e−007
A9 = −2.02162e−009   A11 = 1.19748e−011

16th surface

K = −5.92251e−001    A4 = 1.02794e−005    A6 = −7.96373e−008
A8 = −5.94394e−010   A10 = 1.36279e−011   A12 = −3.71603e−014
A3 = 5.74452e−006    A5 = 5.33288e−007    A7 = 1.59397e−008
A9 = −1.25889e−010   A11 = 1.19434e−013

18th surface

K = −1.18494e+001    A4 = 3.38818e−005    A6 = −6.01722e−007
A8 = 2.86983e−009    A10 = 6.80677e−012   A12 = 2.00545e−013
A3 = −4.48209e−006   A5 = 1.09558e−006    A7 = 3.19549e−008
A9 = −3.09651e−010   A11 = −2.00738e−012

25th surface

K = 2.34648e+001     A4 = 1.02882e−005    A6 = 7.81557e−008
A8 = 2.01591e−009    A10 = 1.40354e−010   A12 = −7.03481e−013
A3 = −1.14827e−005   A5 = −1.86495e−006   A7 = 3.17929e−008
A9 = −1.75337e−009   A11 = 5.68438e−012

-continued

30th surface

K = −9.22698e−001  A4 = 3.15687e−006  A6 = 3.38340e−007
A8 = −2.76705e−009  A10 = 8.25106e−012  A12 = −2.40803e−013
A3 = 1.65294e−005  A5 = −9.80708e−008  A7 = −3.12862e−008
A9 = 3.41496e−010  A11 = 1.44036e−012

|  | Wide-angle end | Intermediate point | Telephoto end |
|---|---|---|---|
| Focal length | 8.01 | 14.80 | 144.84 |
| F-NUMBER | 1.85 | 2.70 | 4.00 |
| Angle of view | 34.85 | 23.27 | 2.52 |
| Image height | 5.58 | 6.37 | 6.37 |
| Entire lens length | 136.44 | 139.56 | 154.65 |
| BF | 1.08 | 1.08 | 1.08 |
| d7 | 1.02 | 12.80 | 49.45 |
| d14 | 38.88 | 19.29 | 1.93 |
| d15 | 13.54 | 16.26 | 1.90 |
| d22 | 1.24 | 6.33 | 1.39 |
| d29 | 5.07 | 7.23 | 28.32 |
| d34 | 11.85 | 12.82 | 6.81 |

TABLE 1

| | Conditional Expression | Numerical Example | | | | |
|---|---|---|---|---|---|---|
| | | 1 | 2 | 3 | 4 | 5 |
| (1) | $|f4/fw| > 10.0$ | 11.9 | 17.3 | 17.2 | 16.56 | 31.2 |
| (2) | $\nu 411 > 60.00$ | 81.54 | 81.54 | 81.54 | 81.54 | 81.54 |
| (3) | $\nu 412 < 35.00$ | 17.98 | 17.98 | 17.98 | 17.98 | 17.98 |
| (4) | $|f4/f5| > 2.00$ | 2.30 | 2.47 | 2.46 | 2.50 | 3.42 |
| (5) | $0.50 < |f41/f42| < 1.20$ | 0.63 | 0.66 | 0.66 | 0.66 | 1.05 |
| (6) | $-2.50 < (1 - \beta 41T) \cdot \beta 42T \cdot \beta 5T < -0.55$ | −1.08 | −1.10 | −1.10 | −1.09 | −1.10 |
| (7) | $r411a < 0$ | −28 | −30 | −30 | −30 | −37 |
| (8) | $\beta 3T/\beta 3W > 1.3$ | 1.4 | 1.7 | 1.7 | 1.7 | 1.9 |
| | fT/fw | 13.82 | 19.35 | 19.36 | 19.37 | 18.08 |
| | β41T | −6.5682 | −6.5884 | −6.93304 | −4.73529 | −1.9741 |
| | β42T | −0.25797 | −0.24275 | −0.23037 | −0.34896 | −0.45551 |
| | β5T | 0.555617 | 0.59673 | 0.601318 | 0.546941 | 0.807365 |

A digital camera according to an embodiment that uses the zoom lens described in the embodiments as a photographic optical system will be described with reference to FIG. 11. In FIG. 11, reference numeral 20 denotes a camera main body; 21 denotes a photographic optical system constituted of the zoom lens according to an embodiment of the present invention; 22 denotes a solid-state image pickup element, such as a CCD or a CMOS sensor, that receives an object image formed by the photographic optical system 21; 23 denotes a recording unit in which an object image received by the solid-state image pickup element is recorded; and 24 denotes a viewfinder for observing an object image displayed on a display device (not shown). The display device is formed of a liquid crystal panel, on which an object image formed on the solid-state image pickup element 22 is displayed. By applying a zoom lens according to an embodiment of the present invention to an optical apparatus, such as a video camera, an image pickup apparatus equipped with a compact zoom lens with a high zoom ratio and having a compact image stabilizing mechanism is achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-232226 filed on Oct. 6, 2009, which is hereby incorporated by reference herein in its entirety.

What is claimed is:

1. A zoom lens comprising, in order from an object side to an image side and arranged along an optical axis, a first lens unit having positive refractive power, a second lens unit having negative refractive power, a third lens unit having positive refractive power, a fourth lens unit having positive or negative refractive power, and a fifth lens unit having positive refractive power, wherein
when zooming from the wide-angle end to the telephoto end, the second lens unit moves monotonically to the image side, the third lens unit moves to the object side in a convex locus, the fifth lens unit moves nonlinearly, and the first and fourth lens units do not move for zooming, the fourth lens unit including a first sub lens unit having negative refractive power and a second sub lens unit having positive refractive power, and the first sub lens unit being moved so as to have a component perpendicular to the optical axis to thereby move the imaging position in a direction perpendicular to the optical axis, wherein
the first sub lens unit includes a first lens having negative refractive power and a second lens having positive or negative refractive power and satisfies the following conditions:

$$|f4/fw| > 10.0$$

$$\nu 411 > 60.00$$

$$\nu 412 < 35.00$$

where f4 is the focal length of the fourth lens unit, fw is the focal length of the entire system at the wide-angle end, ν411 is the Abbe number of the material of the first lens, and ν412 is the Abbe number of the material of the second lens.

2. The zoom lens according to claim 1, further including an aperture stop disposed between the second lens unit and the third lens unit,
wherein the aperture stop moves during zooming independently from the first to fifth lens units.

3. The zoom lens according to claim 1, wherein the following condition is satisfied:

$$|f4/f5| > 2.00$$

where f5 is the focal length of the fifth lens unit.

4. The zoom lens according to claim 1, wherein the following condition is satisfied:

$$0.50 < |f41/f42| < 1.20$$

where f41 is the focal length of the first sub lens unit, and f42 is the focal length of the second sub lens unit.

5. The zoom lens according to claim 1, wherein the following condition is satisfied:

$$-2.50 < (1-\beta 41T) \cdot \beta 42T \cdot \beta 5T < -0.55$$

where β41T is the imaging magnification of the first sub lens unit at the telephoto end, β42T is the imaging magnification of the second sub lens unit at the telephoto end, and β5T is the imaging magnification of the fifth lens unit at the telephoto end.

6. The zoom lens according to claim 1, wherein the following condition is satisfied:

$$r411a < 0$$

where r411a is the radius of curvature of the object-side lens surface of the first lens.

7. The zoom lens according to claim 1, wherein the following condition is satisfied:

$$\beta 3T/\beta 3W > 1.3$$

where β3W is the imaging magnification of the third lens unit at the wide-angle end, and β3T is the imaging magnification of the third lens unit at the telephoto end.

8. An image pickup apparatus comprising the zoom lens according to claim 1 and an image pickup element that receives an image formed by the zoom lens.

9. The image pickup apparatus according to claim 8, wherein the image pickup element moves along the optical axis when zooming.

* * * * *